United States Patent
Xin et al.

(10) Patent No.: US 12,513,034 B2
(45) Date of Patent: Dec. 30, 2025

(54) DATA TRANSMISSION METHOD, DATA MODULATION METHOD, AND ELECTRONIC DEVICE AND STORAGE MEDIUM

(71) Applicant: ZTE CORPORATION, Shenzhen (CN)

(72) Inventors: Yu Xin, Shenzhen (CN); Guanghui Yu, Shenzhen (CN); Tong Bao, Shenzhen (CN); Jin Xu, Shenzhen (CN); Liujun Hu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 40 days.

(21) Appl. No.: 18/696,904

(22) PCT Filed: Sep. 21, 2022

(86) PCT No.: PCT/CN2022/120224
§ 371 (c)(1),
(2) Date: Mar. 28, 2024

(87) PCT Pub. No.: WO2023/051351
PCT Pub. Date: Apr. 6, 2023

(65) Prior Publication Data
US 2025/0039029 A1    Jan. 30, 2025

(30) Foreign Application Priority Data
Sep. 29, 2021    (CN) .......................... 202111151590.4

(51) Int. Cl.
*H04L 27/26*    (2006.01)
(52) U.S. Cl.
CPC .... *H04L 27/2628* (2013.01); *H04L 27/26136* (2021.01); *H04L 27/26362* (2021.01); *H04L 27/2666* (2013.01)

(58) Field of Classification Search
CPC ........... H04L 27/2628; H04L 27/26362; H04L 27/26136; H04L 27/2666
See application file for complete search history.

(56) References Cited

U.S. PATENT DOCUMENTS

| | | | | |
|---|---|---|---|---|
| 5,917,919 A | * | 6/1999 | Rosenthal | ........ G10K 11/17879 381/71.11 |
| 5,987,005 A | * | 11/1999 | Fertner | ................. G06F 17/142 382/280 |

(Continued)

FOREIGN PATENT DOCUMENTS

| | | |
|---|---|---|
| CN | 106470179 A | 3/2017 |
| CN | 107743314 A | 2/2018 |

(Continued)

OTHER PUBLICATIONS

International Search Report in Application No. PCT/CN2022/120224, dated Sep. 21, 2022, 4 pages, including translation.

(Continued)

*Primary Examiner* — Jaison Joseph
(74) *Attorney, Agent, or Firm* — Morgan, Lewis & Bockius LLP

(57) ABSTRACT

A data transmission method includes transmitting to-be-transmitted data in N frequency domain resource blocks, where each of the N frequency domain resource blocks includes K(n) subcarriers, where n=1, 2, . . . , N, N is greater than or equal to 1, and K(n) is greater than or equal to 1; performing inverse Fourier transform and an upsampling operation on the to-be-transmitted data in each of the N frequency domain resource blocks to form N groups of data sequences; and transmitting the N groups of data sequences.

16 Claims, 9 Drawing Sheets

(56) References Cited

U.S. PATENT DOCUMENTS

| | | | | |
|---|---|---|---|---|
| 6,381,263 | B1* | 4/2002 | Suzuki | H04L 27/2657 370/210 |
| 7,280,469 | B2* | 10/2007 | Jin | H04L 5/02 370/344 |
| 9,998,304 | B1 | 6/2018 | Polydoros et al. | |
| 10,535,356 | B2* | 1/2020 | Fuchs | G10L 19/02 |
| 11,616,676 | B1* | 3/2023 | Patchava | H04L 5/0016 375/262 |
| 2002/0154686 | A1* | 10/2002 | Ginesi | H04L 27/2666 375/222 |
| 2009/0245422 | A1* | 10/2009 | Sampath | H04L 27/2644 375/302 |
| 2013/0281148 | A1* | 10/2013 | Seyama | H04W 52/30 455/522 |
| 2014/0093255 | A1* | 4/2014 | Liu | H04B 10/25133 398/208 |
| 2014/0099116 | A1* | 4/2014 | Bai | H04B 10/6161 398/76 |
| 2016/0352543 | A1* | 12/2016 | Hu | H04L 25/03343 |
| 2017/0237596 | A1* | 8/2017 | Wild | H04L 27/26414 370/210 |
| 2018/0278397 | A1* | 9/2018 | Park | H04L 27/2636 |
| 2018/0331871 | A1* | 11/2018 | Martinez | H04W 88/085 |
| 2019/0020522 | A1* | 1/2019 | Sun | H04L 27/26134 |
| 2019/0132177 | A1* | 5/2019 | Wang | H04L 1/003 |
| 2019/0379437 | A1* | 12/2019 | Park | H04L 27/2636 |
| 2020/0052948 | A1* | 2/2020 | Sahin | H04L 27/2607 |
| 2020/0244503 | A1* | 7/2020 | Bala | H04L 5/0007 |
| 2021/0014094 | A1* | 1/2021 | Nadal | H04L 27/2605 |
| 2021/0242952 | A1* | 8/2021 | Lanneer | H04J 11/00 |
| 2021/0288859 | A1* | 9/2021 | Radosevic | H04L 25/03171 |
| 2021/0399932 | A1* | 12/2021 | Laporte | H04L 27/2615 |
| 2022/0158755 | A1* | 5/2022 | Lee | H04L 1/007 |
| 2022/0271983 | A1* | 8/2022 | Ma | H04L 27/2636 |
| 2023/0246677 | A1* | 8/2023 | Liu | H04L 5/0044 370/260 |
| 2024/0275658 | A1* | 8/2024 | Li | H04B 7/06966 |
| 2025/0039029 | A1* | 1/2025 | Xin | H04L 27/2666 |

FOREIGN PATENT DOCUMENTS

| | | |
|---|---|---|
| CN | 110870270 A | 3/2020 |
| CN | 112449429 A | 3/2021 |
| CN | 113169947 A | 4/2021 |
| GB | 2557209 B2 | 6/2018 |

OTHER PUBLICATIONS

Extended European Search Report in Application No. 22874738.2, dated Sep. 15, 2025, 11 pages.

* cited by examiner

DATA TRANSMISSION METHOD, DATA MODULATION METHOD, AND ELECTRONIC DEVICE AND STORAGE MEDIUM

CROSS REFERENCE TO RELATED APPLICATIONS

This is a National Stage Application, filed under 35 U.S.C. 371, of International Patent Application No. PCT/CN2022/120224, filed on Sep. 21, 2022, which claims priority to Chinese Patent Application No. 202111151590.4 filed Sep. 29, 2021, contents of all of which are incorporated herein by reference in their entireties.

TECHNICAL FIELD

The present application relates to the field of wireless communication technology, for example, a data transmission method, a data adjustment method, an electronic device, and a storage medium.

BACKGROUND

Long-Term Evolution (LTE) technology is the fourth generation of wireless cellular communication technology. LTE technology adopts orthogonal frequency-division multiplexing (OFDM) technology, time-frequency resources formed by subcarriers and OFDM symbols form wireless physical time-frequency resources of the LTE system, and the OFDM technology is often used together with cyclic prefixes (CPs) in wireless communication so that the problem of multipath delay is effectively solved, and frequency-selective channels can be divided into a set of parallel flat channels. However, the CP-OFDM system easily causes inter-sub-band interference due to relatively large spectrum leakage. The solution is to use guard intervals in the frequency domain, which, however, results in a decrease in spectral efficiency. In the fifth-generation communication technology, CP-OFDM is still used as the basic waveform, and different parameter sets may be used between two adjacent sub-bands, causing the orthogonality between subcarriers to be disrupted and leading to new interference problems. The solution to this interference problem is to insert a guard bandwidth between two transmission bandwidths with different parameter sets, but in this method, a problem of frequency resource waste exists. Due to the vast frequency band range and diverse deployment manners used in the future sixth-generation communication technology, not only multi-bandwidth channels are required, but also waveform schemes that satisfy different scenarios are required. How to uniformly transmit and apply these waveform schemes becomes a research focus in the future of business.

SUMMARY

A main object of embodiments of the present application is to provide a data transmission method, a data modulation method, an electronic device, and a storage medium.

The embodiments of the present application provide a data transmission method. The method includes the following.

To-be-transmitted data is transmitted in N frequency domain resource blocks, where each of the N frequency domain resource blocks includes $K(n)$ subcarriers, where $n=1, 2, \ldots, N$, N is greater than or equal to 1, and $K(n)$ is greater than or equal to 1; an inverse Fourier transform and an upsampling operation are performed on the to-be-transmitted data in each of the N frequency domain resource blocks so as to form N groups of data sequences; and the N groups of data sequences are transmitted.

The embodiments of the present application further provide a data modulation method. The method includes the following.

To-be-transmitted data is divided into N groups of data sets, where each group of the N groups of data sets includes $K(n)$ pieces of to-be-transmitted data, where $n=1, 2, \ldots, N$, a value of N is greater than or equal to 1, and a value of $K(n)$ is greater than or equal to 1; an inverse Fourier transform and an upsampling operation are performed on each of the N groups of data sets so as to form N groups of data sequences; and the N groups of data sequences are transmitted.

The embodiments of the present application further provide a data transmission method. The method includes the following.

To-be-transmitted data is transmitted in N frequency domain resource blocks, where each of the N frequency domain resource blocks includes $K(n)$ subcarriers, where $n=1, 2, \ldots, N$, a value of N is greater than or equal to 1, and a value of $K(n)$ is greater than or equal to 1; an inverse Fourier transform is performed on the to-be-transmitted data in each of the N frequency domain resource blocks so as to form N groups of data sequences; and the N groups of data sequences are transmitted.

The number $K(n)$ of subcarriers on at least one of the N frequency domain resource blocks does not satisfy 2 to the power of i, and oversampling inverse Fourier transform is used so that the number of inverse Fourier transform points is 2 to the power of i, and the N frequency domain resource blocks use the same number of inverse Fourier transform points, where i is an integer, and the number of inverse Fourier transform points is less than or equal to the sum of the numbers of subcarriers included in the N frequency domain resource blocks.

The embodiments of the present application further provide an electronic device. The electronic device includes one or more processors and a memory configured to store one or more programs.

When executed by the one or more processors, the one or more programs cause the one or more processors to perform the data transmission method according to any one of the embodiments of the present application.

The embodiments of the present application further provide an electronic device. The electronic device includes one or more processors and a memory configured to store one or more programs.

When executed by the one or more processors, the one or more programs cause the one or more processors to perform the data modulation method according to any one of the embodiments of the present application.

The embodiments of the present application further provide a computer-readable storage medium. The computer-readable storage medium is configured to store one or more programs executable by one or more processors to perform the data transmission method according to any one of the embodiments of the present application or the data modulation method according to any one of the embodiments of the present application.

DETAILED DESCRIPTION

The embodiments described herein are intended to explain the present application.

Suffixes such as "module", "component", or "unit" used for indicating elements in the subsequent description are used merely for facilitating the description of the present application and have no particular meaning in themselves. Therefore, "module", "component", or "unit" may be used in a mixed manner.

Figure 1:
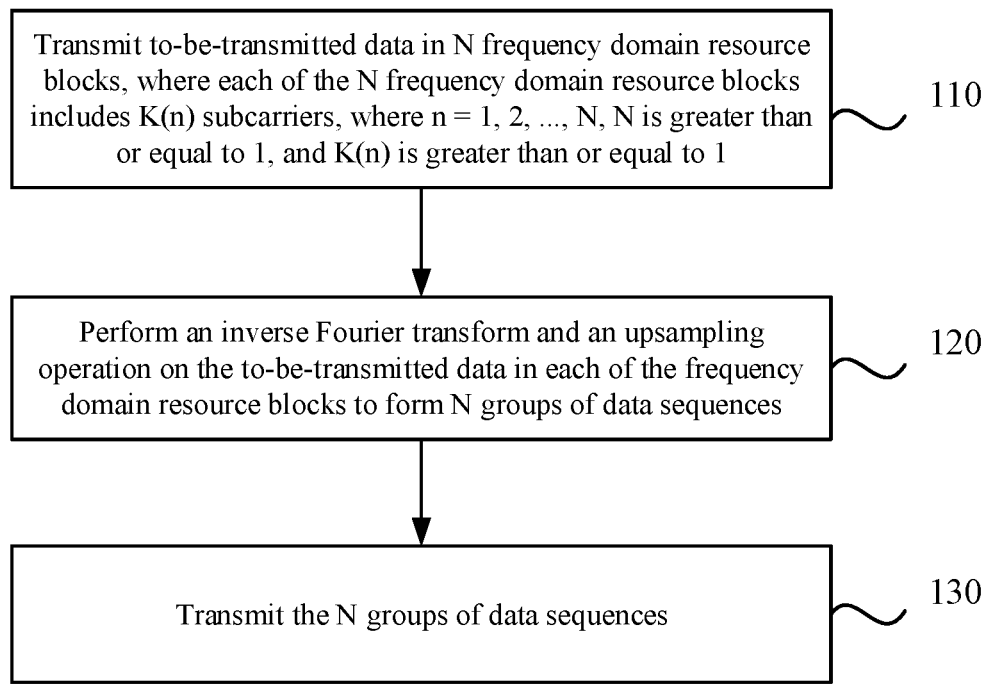
FIG. 1 is a flowchart of a data transmission method according to an embodiment of the present application.

FIG. 1 is a flowchart of a data transmission method according to an embodiment of the present application. The embodiment of the present application is applicable to data transmission. The method may be performed by a base station or a terminal device. The apparatus may be implemented by software and/or hardware. Referring to FIG. 1, the method provided in the embodiment of the present application includes the following.

In 110, transmitting to-be-transmitted data in N frequency domain resource blocks, where each of the N frequency domain resource blocks includes K(n) subcarriers, where n=1, 2, . . . , N, N is greater than or equal to 1, and K(n) is greater than or equal to 1.

The to-be-transmitted data is information that can be transmitted in the frequency domain. The to-be-transmitted data may include information data, reference signal data, or control data. The frequency domain resource block may be formed by one or more continuous or non-continuous subcarriers in the frequency domain.

In the embodiment of the present application, the to-be-transmitted data may be transmitted in the frequency domain resource blocks formed by one or more subcarriers.

In 120, performing an inverse Fourier transform and an upsampling operation on to-be-transmitted data in each of the frequency domain resource blocks so as to form N groups of data sequences.

The inverse Fourier transform may be a process of converting a frequency domain signal into a time domain signal. The upsampling operation may be an operation of sampling instantaneous values of the frequency domain resource blocks bearing the to-be-transmitted data at a preset time interval. During the upsampling operation, an operation such as original data retention, interpolation, or zero padding may be performed on the frequency domain resource blocks bearing the to-be-transmitted data so that the sampling frequency during the sampling process is greater than the sampling frequency of the original signal.

The inverse Fourier transform and the upsampling operation may be performed on one or more frequency domain resource blocks carrying the to-be-transmitted data so as to generate one or more data sequences.

In 130, transmitting the N groups of data sequences.

The generated one or more data sequences may be transmitted.

In the embodiment of the present application, the to-be-transmitted data is transmitted in one or more frequency domain resource blocks, each frequency domain resource block may include one or more subcarriers, the inverse Fourier transform and the upsampling process are performed on the to-be-transmitted data in each of the frequency domain resource blocks so as to generate one or more groups of data sequences, and the generated data sequences are transmitted, so as to achieve the common use of multiple frequency domain resource blocks, thereby improving frequency domain resource utilization.

Based on the preceding embodiment of the application, a sampling multiple of the upsampling operation satisfies 2 to the power of i, where i is an integer.

The sampling multiple may be a multiple of the sampling frequency after the inverse Fourier transform.

In the case where the to-be-transmitted data on the frequency domain resource blocks are upsampled, the sampling multiple may satisfy 2 to the power of i, where i is an integer.

Based on the preceding embodiment of the application, performing the upsampling operation on the to-be-transmitted data in each of the frequency domain resource blocks includes separately inserting $2^i-1$ zeros into each data generated after the inverse Fourier transform of the to-be-transmitted data, where i is an integer.

In the embodiment of the present application, after the inverse Fourier transformation of the to-be-transmitted data, one or more pieces of data in the time domain may be generated, and $2^i-1$ zeros may be separately inserted into each data to achieve upsampling so that the sampling frequency of each data is greater than the sampling frequency after the inverse Fourier transform.

Figure 2:
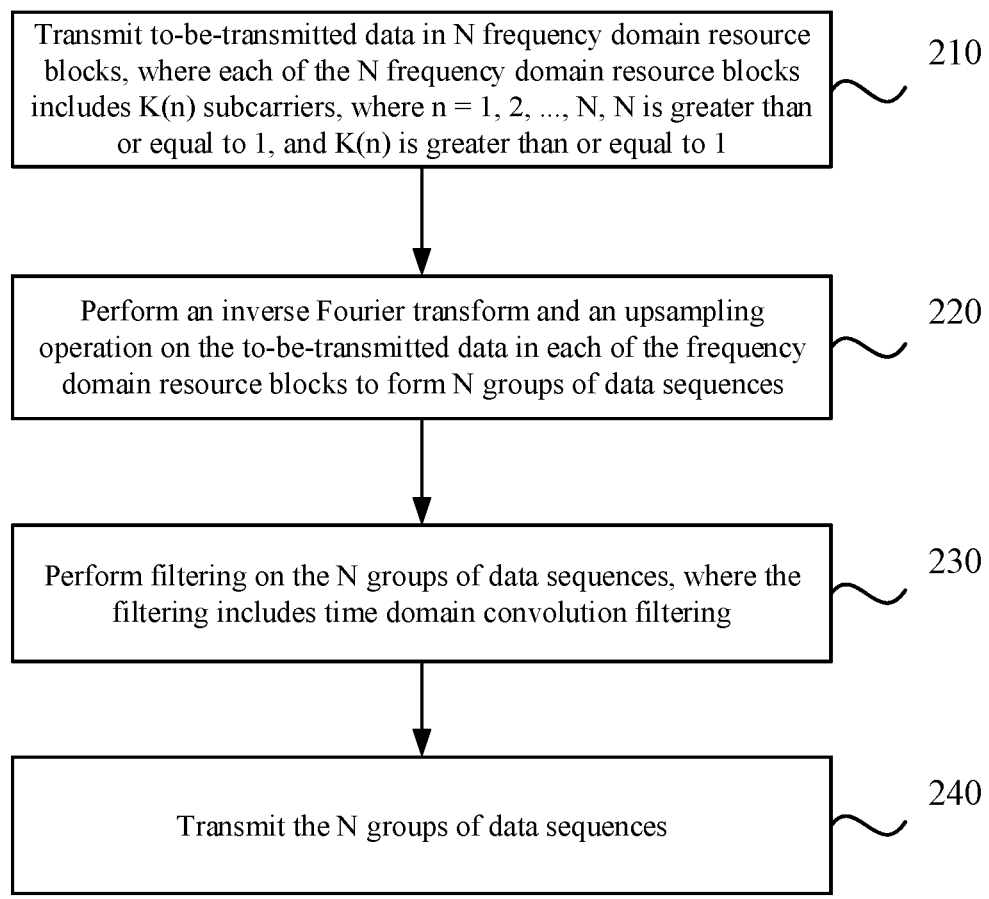
FIG. 2 is a flowchart of another data transmission method according to an embodiment of the present application.

FIG. 2 is a flowchart of another data transmission method according to an embodiment of the present application. The embodiment of the present application is described based on the preceding embodiment of the application. Referring to FIG. 2, the data transmission method provided in the embodiment of the present application includes the following.

In 210, transmitting to-be-transmitted data in N frequency domain resource blocks, where each of the N frequency domain resource blocks includes K(n) subcarriers, where n=1, 2, . . . , N, N is greater than or equal to 1, and K(n) is greater than or equal to 1.

In 220, performing an inverse Fourier transform and an upsampling operation on to-be-transmitted data in each of the frequency domain resource blocks so as to form N groups of data sequences.

In 230, performing filtering on the N groups of data sequences, where the filtering includes time domain convolution filtering.

The filtering may be an operation of filtering out characteristic band frequencies in a signal to prevent signal interference.

In the embodiment of the present application, time domain convolution filtering may be performed on one or more acquired data sequences to reduce interference in data transmission.

In 240, transmitting the N groups of data sequences.

Based on the preceding embodiment of the application, a filtering function for filtering includes at least one of the following: a root-raised cosine function, a raised cosine function, a rectangular function, or an isotropic orthogonal transform function.

In the embodiment of the present application, when the generated N groups of data sequences are filtered, one or more functions among the root-raised cosine function, the raised cosine function, the rectangular function, or the isotropic orthogonal transform function may be used for filtering, and the N groups of data sequences may be filtered using the same filtering function, or the N groups of data sequences may be filtered using different filtering functions.

Based on the preceding embodiment of the application, filtering function parameters used by different frequency domain resource blocks are different.

The filtering function parameters may be values in the filtering function.

Different filtering function parameters may be used for the to-be-transmitted data on different frequency domain resource blocks.

Based on the preceding embodiment of the application, filtering function parameters used by different frequency domain resource blocks may be the same.

Based on the preceding embodiment of the application, after the N groups of data sequences are filtered, the method further includes performing a dot multiply operation on the N groups of data sequences.

After the N groups of data sequences are separately filtered, the dot multiply operation may also be separately performed on the N groups of data sequences so that each element in each group of data sequences is multiplied by a dot multiply data element.

Based on the preceding embodiment of the application, a to-be-multiplied sequence in the dot multiply operation includes a sequence of values of which modulo are equal and phases sequentially change by the same value $\theta(n)$, where different frequency domain resource blocks correspond to different $\theta(n)$.

The to-be-multiplied sequence may include one or more data elements, and the to-be-multiplied sequence may be separately dot-multiplied by elements in the N groups of data sequences.

In other words, the to-be-multiplied sequence is $\exp(j*\theta(n)*i)$. j denotes the imaginary symbol, and i denotes the sequence number of each element in the to-be-multiplied sequence.

In the embodiment of the present application, the N groups of data sequences in the dot multiply operation may be separately dot-multiplied by the to-be-multiplied sequence. The to-be-multiplied sequence may be a sequence of values. The change in value of each element in the sequence of values is $\theta(n)$. The modulo of the to-be-multiplied sequences multiplied by different data sequences are equal. The change $\theta(n)$ of each element in the to-be-multiplied sequence multiplied by the data sequences corresponding to different frequency domain resource blocks may be different.

Based on the preceding embodiment of the application, a function for filtering is after a dot multiply operation, and a to-be-multiplied sequence includes a sequence of data of which modulo are equal and phases sequentially change by the same value $\theta(n)$, where different frequency domain resource blocks use different $\theta(n)$.

The function for the filtering operation on the N groups of data sequences may be a function after the dot multiply operation. The to-be-multiplied sequence multiplied by the N groups of data sequences may be the sequence of data of which modulo are equal and phases sequentially change by the same value $\theta(n)$, and the phase change value $\theta(n)$ of the to-be-multiplied sequence used by the data sequences on different frequency domain resource blocks are different.

Figure 3:
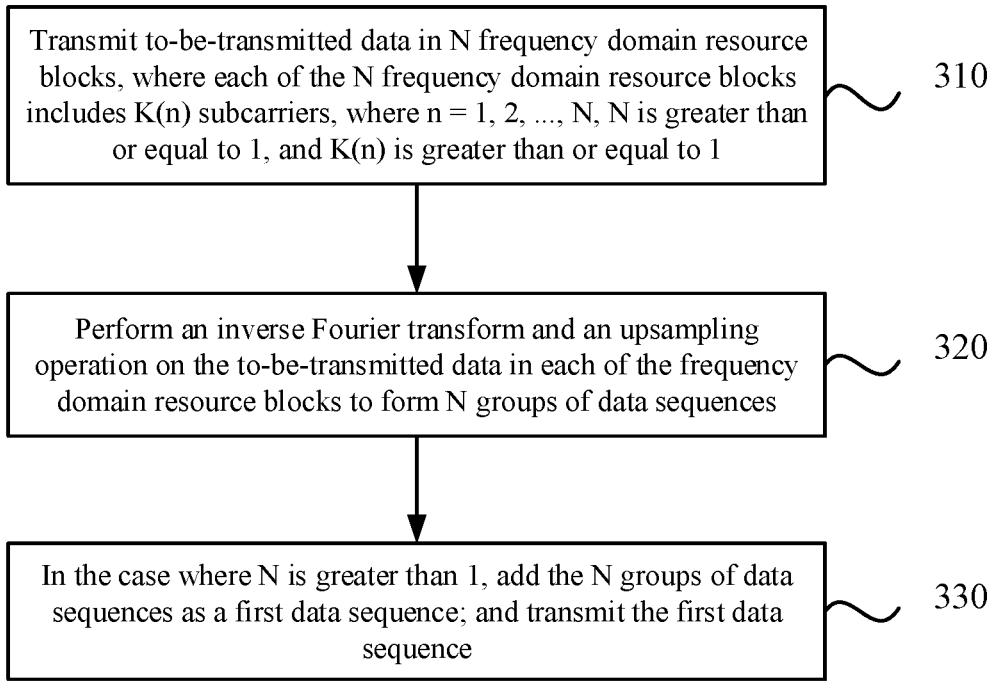
FIG. 3 is a flowchart of another data transmission method according to an embodiment of the present application.

FIG. 3 is a flowchart of another data transmission method according to an embodiment of the present application. The embodiment of the present application is described based on the preceding embodiment of the application. Referring to FIG. 3, the method provided in the embodiment of the present application includes the following.

In 310, to-be-transmitted data is transmitted in N frequency domain resource blocks, where each of the N frequency domain resource blocks includes K(n) subcarriers, where n=1, 2, . . . , N, N is greater than or equal to 1, and K(n) is greater than or equal to 1.

In 320, an inverse Fourier transform and an upsampling operation are performed on to-be-transmitted data in each of the frequency domain resource blocks so as to form N groups of data sequences.

In 330, in the case where N is greater than 1, the N groups of data sequences are added as a first data sequence; and the first data sequence is transmitted.

In the embodiment of the present application, in the case where the number of generated data sequences is greater than 1, the generated groups of data sequences may be added as the first data sequence, and the generated first data sequence may be transmitted.

Based on the preceding embodiment of the application, the ratio of adjacent subcarrier spacings of any two frequency domain resource blocks satisfies 2 to the power of i, where i is an integer.

In the N frequency domain resource blocks, the ratio of any two adjacent subcarrier spacings satisfies 2 to the power of i, and i is an integer. In the case where the value of i is zero, the adjacent subcarrier spacings of the N frequency domain resource blocks are the same. In the case where the value of i is not zero, the adjacent subcarrier spacings of the N frequency domain resource blocks are different.

Based on the preceding embodiment of the application, the ratio of spectrum bandwidths of any two frequency domain resource blocks satisfies 2 to the power of i, where i is an integer.

In the embodiment of the present application, the ratio of spectrum bandwidths of any two frequency domain resource blocks among the N frequency domain resource blocks may be 2 to the power of i. In the case where the value of i is zero, the spectrum bandwidths of the N frequency domain resource blocks are the same. In the case where the value of i is not zero, the spectrum bandwidths of the N frequency domain resource blocks are different.

Based on the preceding embodiment of the application, the ratio of the numbers of subcarriers of any two frequency domain resource blocks satisfies 2 to the power of i, where i is an integer.

In the embodiment of the present application, the ratio of the numbers of subcarriers included in any two frequency domain resource blocks among the N frequency domain resource blocks may satisfy 2 to the power of i. In the case where the value of i is zero, the numbers of subcarriers included in the N frequency domain resource blocks are the same. In the case where the value of i is not zero, the numbers of subcarriers included in the N frequency domain resource blocks are different.

Based on the preceding embodiment of the application, among the N frequency domain resource blocks, the spectrum intervals of adjacent frequency domain resource blocks are equal.

Based on the preceding embodiment of the application, the spectrum bandwidths of the N frequency domain resource blocks are equal.

Based on the preceding embodiment of the application, the numbers of subcarriers included in the N frequency domain resource blocks are equal.

Based on the preceding embodiment of the application, the adjacent subcarrier spacings of the N frequency domain resource blocks are equal.

Based on the preceding embodiment of the application, among the N frequency domain resource blocks, the spectrum intervals of adjacent frequency domain resource blocks are not equal.

Based on the preceding embodiment of the application, the spectrum bandwidths of the N frequency domain resource blocks are not equal.

In the embodiment of the present application, in the case where the spectra of the N frequency domain resource blocks are not equal, when upsampling is performed, the upsampling multiples used by each of the frequency domain resource blocks are different.

Based on the preceding embodiment of the application, the numbers of subcarriers included in the N frequency domain resource blocks are not equal.

Based on the preceding embodiment of the application, the adjacent subcarrier spacings of the N frequency domain resource blocks are not equal.

Based on the preceding embodiment of the application, the number of inverse Fourier transform points of the inverse Fourier transform is greater than or equal to K(n).

The number of inverse Fourier transform points of the inverse Fourier transform performed on the to-be-transmitted data on each of the frequency domain resource blocks is greater than or equal to the number of subcarriers included in the each of the frequency domain resource blocks.

Based on the preceding embodiment of the application, the number of inverse Fourier transform points of the inverse Fourier transform is 2 to the power of i, where i is an integer.

The number of inverse Fourier transform points used for the to-be-transmitted data of each of the frequency domain resource blocks is 2 to the power of i.

Based on the preceding embodiment of the application, the number K(n) of subcarriers on at least one frequency domain resource block does not satisfy 2 to the power of i, and oversampling inverse Fourier transform is used so that the number of inverse Fourier transform points is 2 to the power of i, and the numbers of inverse Fourier transform points used by each of the frequency domain resource blocks are the same.

In the embodiment of the present application, the number K(n) of subcarriers included in one or more frequency domain resource blocks among the N frequency domain resource blocks does not satisfy 2 to the power of i, and the oversampling inverse Fourier transform may be performed on the to-be-transmitted data on the frequency domain resource block so that the number of inverse Fourier transform points used by the frequency domain resource block satisfies 2 to the power of i, and the numbers of inverse Fourier transform points used by each of the frequency domain resource blocks are the same.

Based on the preceding embodiment of the application, separately performing the inverse Fourier transform on the to-be-transmitted data in each of the frequency domain resource blocks includes in the case where adjacent subcarrier spacings of the N frequency domain resource blocks are equal, but the numbers of the included subcarriers are not equal, oversampling inverse Fourier transform is used so that the number of inverse Fourier transform points is 2 to the power of i, and the numbers of inverse Fourier transform points used by each of the frequency domain resource blocks are the same.

In the case where the adjacent subcarrier spacings of the N frequency domain resource blocks are equal, but the numbers of the included subcarriers are different, the oversampling inverse Fourier transform is performed on the to-be-transmitted data on each of the frequency domain resource blocks so that the number of used inverse Fourier transform points is 2 to the power of i, the numbers of inverse Fourier transform points are the same, and the sequence lengths of the N groups of data sequences formed by the inverse Fourier transform are the same.

The number of inverse Fourier transform points of the inverse Fourier transform is less than or equal to the sum of the numbers of subcarriers included in the N frequency domain resource blocks.

In the embodiment of the present application, the number of inverse Fourier transform points used for the inverse Fourier transform performed on the to-be-transmitted data on each of the frequency domain resource blocks is less than or equal to the sum of the numbers of subcarriers included in the N frequency domain resource blocks.

Based on the preceding embodiment of the application, the number of inverse Fourier transform points of the inverse Fourier transform is less than or equal to two times the number of subcarriers included in the frequency domain resource blocks.

In the embodiment of the present application, the number of inverse Fourier transform points used for the inverse Fourier transform performed on the to-be-transmitted data on each of the frequency domain resource blocks is less than or equal to two times the number of subcarriers included in the frequency domain resource blocks.

Before the inverse Fourier transform is performed on the to-be-transmitted data on each of the frequency domain resource blocks, the Fourier transform is performed on the to-be-transmitted data on at least one frequency domain resource block.

Before the inverse Fourier transform is performed on the to-be-transmitted data on each of the frequency domain resource blocks, the Fourier transform is performed on the to-be-transmitted data on each of the frequency domain resource blocks.

Before the Fourier transform is performed on the to-be-transmitted data on each of the frequency domain resource blocks, the numbers of pieces of to-be-transmitted data on each of the frequency domain resource blocks are equal.

Before the Fourier transform is performed on the to-be-transmitted data on each of the frequency domain resource blocks, the numbers of pieces of to-be-transmitted data on each of the frequency domain resource blocks are not equal, and the numbers of fast Fourier transform (FFT) points used for the Fourier transform performed on the to-be-transmitted data on each of the frequency domain resource blocks are not equal, but the numbers of inverse fast Fourier transform (IFFT) points used for the inverse Fourier transform performed on the to-be-transmitted data are equal.

Based on the preceding embodiment of the application, a cyclic prefix (CP) is added to each of the data sequences.

Based on the preceding embodiment of the application, a guard interval (GI) is added to each of the data sequences, where the GI is empty data.

The GI may be added to a data sequence, and the GI may be empty data.

Based on the preceding embodiment of the application, the to-be-transmitted data includes constellation adjustment data or reference signal data.

Figure 4:
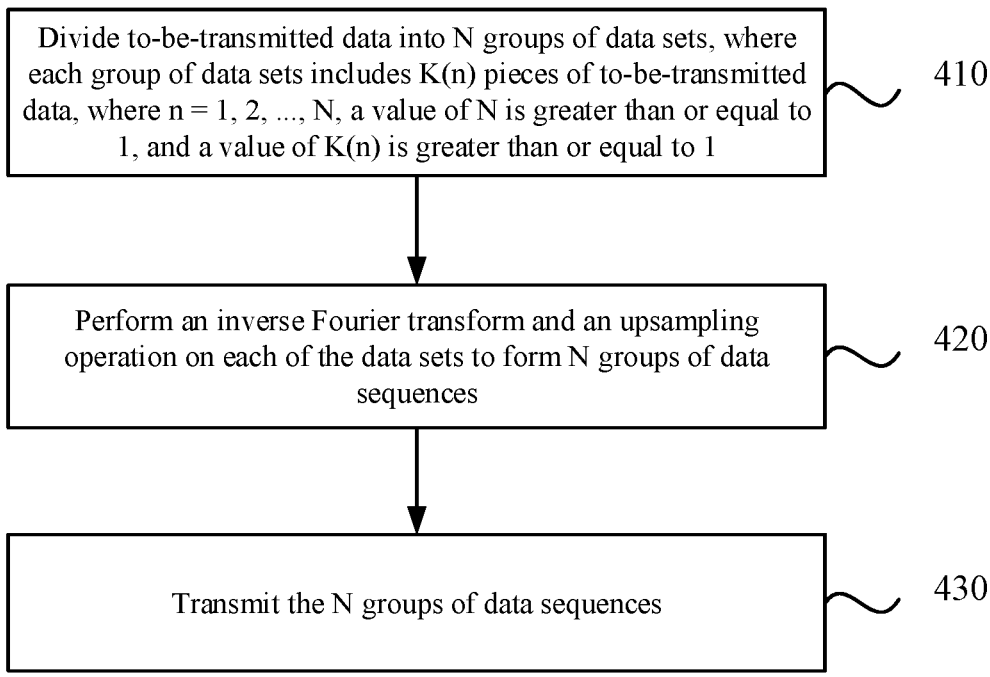
FIG. 4 is a flowchart of a data modulation method according to an embodiment of the present application.

FIG. 4 is a flowchart of a data modulation method according to an embodiment of the present application. The embodiment of the present application is applicable to data transmission. The method may be performed by a base station or a terminal device. The apparatus may be implemented by software and/or hardware. Referring to FIG. 4, the method provided in the embodiment of the present application includes the following.

In 410, to-be-transmitted data is divided into N groups of data sets, where each group of data sets includes K(n) pieces of to-be-transmitted data, where n=1, 2, . . . , N, a value of N is greater than or equal to 1, and a value of K(n) is greater than or equal to 1.

The to-be-transmitted data is information that can be transmitted in the frequency domain. The to-be-transmitted data may include information data, reference signal data, or control data. The data set may include one or more pieces of to-be-transmitted data. The numbers of pieces of to-be-transmitted data included in different data sets may be the same or different.

In the embodiment of the present application, the to-be-transmitted data may be divided into N groups of data sets, each group of data sets may include K(n) pieces of to-be-transmitted data, and the values of K(n) in different data sets may be the same or different.

In 420, an inverse Fourier transform and an upsampling operation are performed on each of the data sets so as to form N groups of data sequences.

The inverse Fourier transform and the upsampling operation may be performed on the data sets including one or more pieces of to-be-transmitted data so as to generate one or more data sequences.

In 430, the N groups of data sequences are transmitted.

One or more generated data sequences may be transmitted.

In the embodiment of the present application, the to-be-transmitted data is divided into one or more groups of data sets, each group of data sets may include one or more pieces of to-be-transmitted data, the inverse Fourier transform and the upsampling process is performed on the to-be-transmitted data in each of the data sets so as to generate one or more groups of data sequences, and the generated data sequences are transmitted, so as to achieve the common use of multiple frequency domain resource blocks, thereby improving frequency domain resource utilization.

Based on the preceding embodiment of the application, a sampling multiple of the upsampling operation satisfies 2 to the power of i, where i is an integer.

Based on the preceding embodiment of the application, after the inverse Fourier transform and the upsampling operation are separately performed on each of the data sets, the method further includes filtering the N groups of data sequences, where the filtering includes time domain convolution filtering.

Based on the preceding embodiment of the application, a filtering function for filtering includes at least one of the following: a root-raised cosine function, a raised cosine function, a rectangular function, or an isotropic orthogonal transform function.

Based on the preceding embodiment of the application, after the N groups of data sequences are filtered, the method further includes performing a dot multiply operation on the N groups of data sequences.

Based on the preceding embodiment of the application, a to-be-multiplied sequence in the dot multiply operation includes a sequence of values of which modulo are equal and phases sequentially change by the same θ(n), where different data sets correspond to different values of the θ(n).

Based on the preceding embodiment of the application, a function for filtering is after a dot multiply operation, and a to-be-multiplied sequence includes a data sequence of which modulo are equal and phases sequentially change by the same value θ(n), where different data sets use different θ(n).

Based on the preceding embodiment of the application, transmitting the N groups of data sequences includes in the case where N is greater than 1, adding the N groups of data sequences as a first data sequence; and transmitting the first data sequence.

Based on the preceding embodiment of the application, the numbers of pieces of the to-be-transmitted data included in each of the data sets are different.

The numbers of pieces of the to-be-transmitted data included in each of the data sets may be different.

Based on the preceding embodiment of the application, the numbers of pieces of the to-be-transmitted data included in each of the data sets are the same.

The numbers of pieces of the to-be-transmitted data included in each of the data sets may be the same.

Based on the preceding embodiment of the application, the number of inverse Fourier transform points of the inverse Fourier transform is greater than or equal to K(n).

In the embodiment of the present application, the number of inverse Fourier transform points used for the inverse Fourier transform performed on each of the data sets is greater than or equal to the number of pieces of the included to-be-transmitted data. The inverse Fourier transform may be non-oversampling inverse Fourier transform.

Based on the preceding embodiment of the application, a value of the number of inverse Fourier transform points of the inverse Fourier transform is 2 to the power of i, where i is an integer.

Based on the preceding embodiment of the application, the number of pieces of to-be-transmitted data included in at least one data set does not satisfy 2 to the power of i, and oversampling inverse Fourier transform is used so that the number of inverse Fourier transform points is 2 to the power of i, and the numbers of inverse Fourier transform points used by each of the data sets are the same.

In the embodiment of the present application, the number of pieces of to-be-transmitted data included in one or more groups of data sets in the data sets does not satisfy 2 to the power of i, and the oversampling inverse Fourier transform may be performed on the data set so that the number of used inverse Fourier transform points satisfies 2 to the power of i, the numbers of inverse Fourier transform points used in each of the data sets are the same, and the lengths of the N groups of data sequences generated after the transform may be the same.

Figure 5:
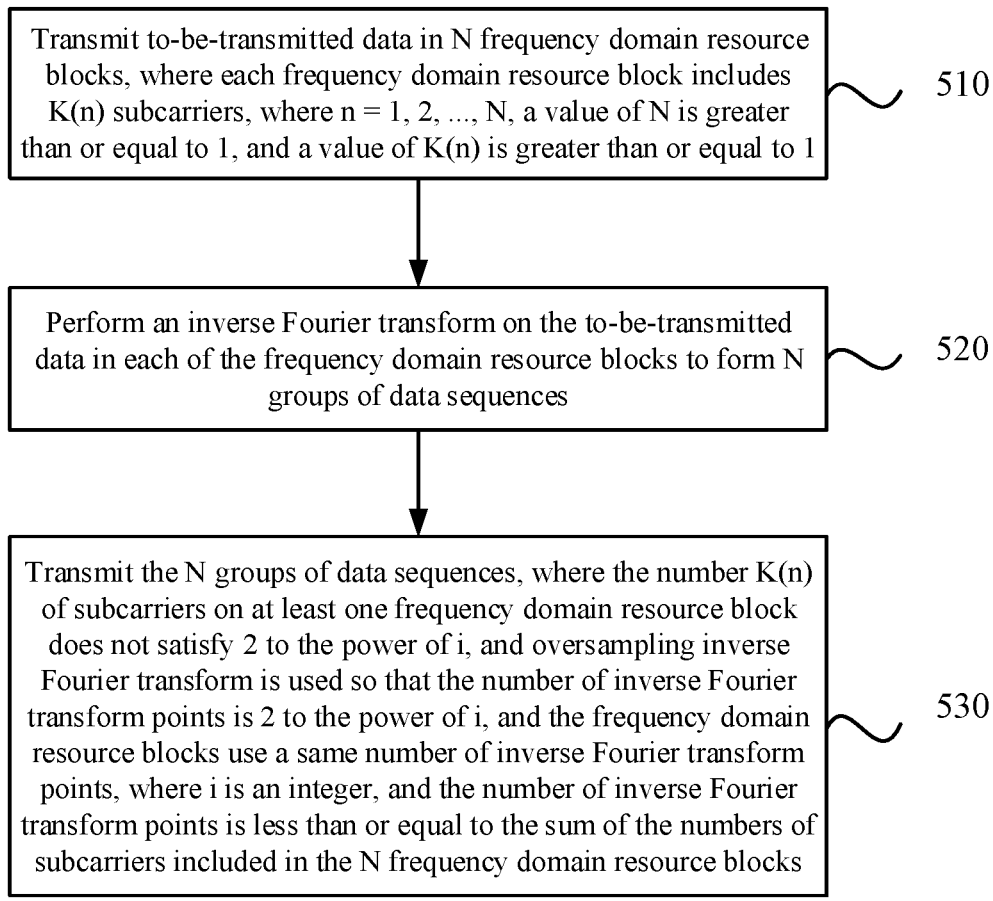
FIG. 5 is a flowchart of a data transmission method according to an embodiment of the present application.

FIG. 5 is a flowchart of a data transmission method according to an embodiment of the present application. The embodiment of the present application is applicable to data transmission. The method may be performed by a base station or a terminal device. The apparatus may be implemented by software and/or hardware. Referring to FIG. 5, the method provided in the embodiment of the present application includes the following.

In 510, to-be-transmitted data is transmitted in N frequency domain resource blocks, where each frequency domain resource block includes K(n) subcarriers, where n=1, 2, . . . , N, a value of N is greater than or equal to 1, and a value of K(n) is greater than or equal to 1.

The to-be-transmitted data may be information transmitted in the frequency domain. The to-be-transmitted data may include information data, reference signal data, or control data. The frequency domain resource block may be formed by one or more continuous or non-continuous subcarriers in the frequency domain.

In the embodiment of the present application, the to-be-transmitted data may be transmitted in the frequency domain resource blocks formed by one or more subcarriers.

In 520, an inverse Fourier transform is performed on to-be-transmitted data in each of the frequency domain resource blocks so as to form N groups of data sequences.

The inverse Fourier transform may be a process of converting a frequency domain signal into a time domain signal. The upsampling operation may be an operation of sampling instantaneous values of the frequency domain resource blocks bearing the to-be-transmitted data at a preset time interval. During the upsampling operation, an operation such as original data retention, interpolation, or zero padding may be performed on the frequency domain resource blocks bearing the to-be-transmitted data so that the sampling frequency during the sampling process is greater than the sampling frequency of the original signal.

The inverse Fourier transform and the upsampling operation may be performed on one or more frequency domain resource blocks carrying the to-be-transmitted data so as to generate one or more data sequences.

In 530, the N groups of data sequences are transmitted, where the number K(n) of subcarriers on at least one frequency domain resource block does not satisfy 2 to the power of i, and oversampling inverse Fourier transform is used so that the number of inverse Fourier transform points is 2 to the power of i, and the numbers of inverse Fourier transform points used by each of the frequency domain resource blocks are the same, where i is an integer, and the number of inverse Fourier transform points is less than or equal to the sum of the numbers of subcarriers included in the N frequency domain resource blocks.

One or more generated data sequences may be transmitted. In the embodiment of the present application, the number K(n) of subcarriers included in one or more frequency domain resource blocks among the N frequency domain resource blocks does not satisfy 2 to the power of i, and the oversampling inverse Fourier transform may be performed on the to-be-transmitted data on the frequency domain resource block so that the number of inverse Fourier transform points used by the frequency domain resource block satisfies 2 to the power of i, the numbers of inverse Fourier transform points used by the frequency domain resource blocks are the same, and the number of inverse Fourier transform points may be less than the sum of the numbers of subcarriers included in the N frequency domain resource blocks.

Based on the preceding embodiment of the application, the number of inverse Fourier transform points of the inverse Fourier transform is less than or equal to two times the number of subcarriers included in the frequency domain resource blocks.

In the embodiment of the present application, the number of inverse Fourier transform points used for the inverse Fourier transform performed on the to-be-transmitted data on each of the frequency domain resource blocks is less than or equal to two times the number of subcarriers included in the frequency domain resource blocks.

Figure 6:
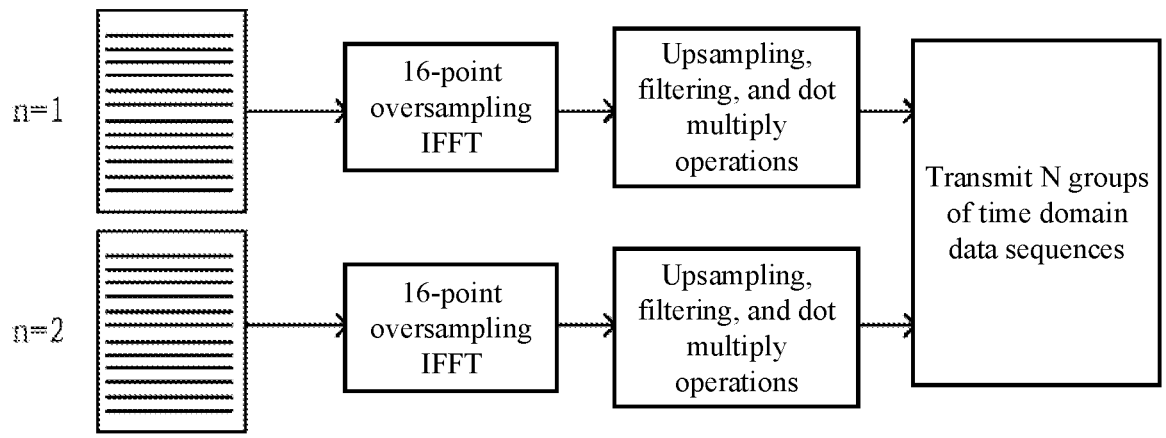
FIG. 6 is an example diagram of a data transmission method according to an embodiment of the present application.

In an example embodiment, the to-be-transmitted data is transmitted in the N frequency domain resource blocks, and each of the N resource blocks includes k(n) subcarriers. FIG. 6 is an example diagram of a data transmission method according to an embodiment of the present application. Referring to FIG. 6, the numbers k(n) of subcarriers included in the N resource blocks are equal, and k(n)=12; the spectrum bandwidths of the N resource blocks are equal, and the spectrum intervals of adjacent frequency domain resource blocks are also equal; the spectrum bandwidths of the resource blocks are equal to the spectrum intervals of adjacent frequency domain resource blocks (that is, no spare subcarrier exists between adjacent frequency domain resource blocks); and as shown in FIG. 6, N=2.

The inverse Fourier transform is separately performed on the to-be-transmitted data on the k(n) subcarriers of each resource block so as to obtain N groups of time domain data sequences. In the embodiment of the present application, based on the data on 12 subcarriers, 4 more zeros are added so that the inverse Fourier transform is a 16-point oversampling inverse Fourier transform, that is, the number of IFFT points is 2 to the power of i. Then, the upsampling, filtering, and dot multiply operations are separately performed on the N groups of time domain data sequences. In the embodiment of the present application, it is assumed that the filtering function for filtering is a frequency domain root-raised cosine function; and a data sequence multiplied in the dot multiply operation includes a data sequence of which modulo are equal and phases sequentially change by the same value θ(n). Moreover, different groups of time domain data sequences correspond to different θ(n).

For example, the first group (that is, n=1) of the time domain data sequence is (a1, a2, . . . , a16). After R times of upsampling (in the embodiment of the present application, it is assumed that R=4), the time domain data sequence is (a1, 0, 0, 0, a2, 0, 0, 0, . . . , a16, 0, 0, 0). Assuming that a data sequence in the form of a time domain discrete function of the filtering function is (f1, f2, f3 . . . , fM), then after the convolution operation of the time domain data sequence and the time domain filtering function, the resulting data sequence is assumed to be af(j), where j=1, 2, . . . , and 64+M−1. Assuming that a data sequence for the dot multiply is (exp(j.0), exp(j.0), exp(j.0), exp(j.0)), where the modulus is 1, θ(1)=0, and the phase of each element of the data sequence sequentially changes by the same value θ(1)=0 (here each element is equal to 1). During the dot multiply operation, the preceding dot-multiplied data sequence is repeated periodically so that the length is also 64+M−1. After the dot multiply operation, the first group of the time domain data sequence becomes af(j), where j=1, 2, . . . , 64+M−1.

For example, the second group (that is, n=2) of the time domain data sequence is (b1, b2, . . . , b16). After R times of upsampling (in the embodiment of the present application, it is assumed that R=4), the time domain data sequence is (b1, 0, 0, 0, b2, 0, 0, 0, . . . , b16, 0, 0, 0). If the data sequence in the form of the time domain discrete function of the filtering function is still (f1, f2, f3, . . . , fM), then after the convolution operation of the time domain data sequence and the time domain filtering function, the resulting data sequence is assumed to be bf(j), where j=1, 2, . . . , and 64+M−1. Assuming that the multiplied data sequence is (exp(j.0), exp(j.pi/2), exp(j.pi), exp(j.3pi/2)), where the modulus is 1, θ(2)=pi/2, and the phase of each element of the data sequence sequentially changes by the same value θ(2)=pi/2. During the dot multiply operation, the preceding dot-multiplied data sequence is repeated periodically so that the length is also 64+M−1. After the dot multiply operation, the second group of the time domain data sequence becomes bf'(j), where j=1, 2, . . . , 64+M−1. Assuming that in this embodiment, N=2, then two groups of time domain data sequences are transmitted.

Transmitting the two groups of time domain data sequences further includes adding the two groups of time domain data sequences to form one group of the time domain data sequence: af'(j)+bf'(j), where j=1, 2, . . . , 64+M−1.

The preceding dot multiply operation may also be performed on the filtering function so that different new filtering functions are obtained for different resource blocks. Then, the time domain convolution operation is separately performed on the upsampled data of different resource blocks using different new filtering functions to form the N groups of time domain data sequences.

Figure 7:
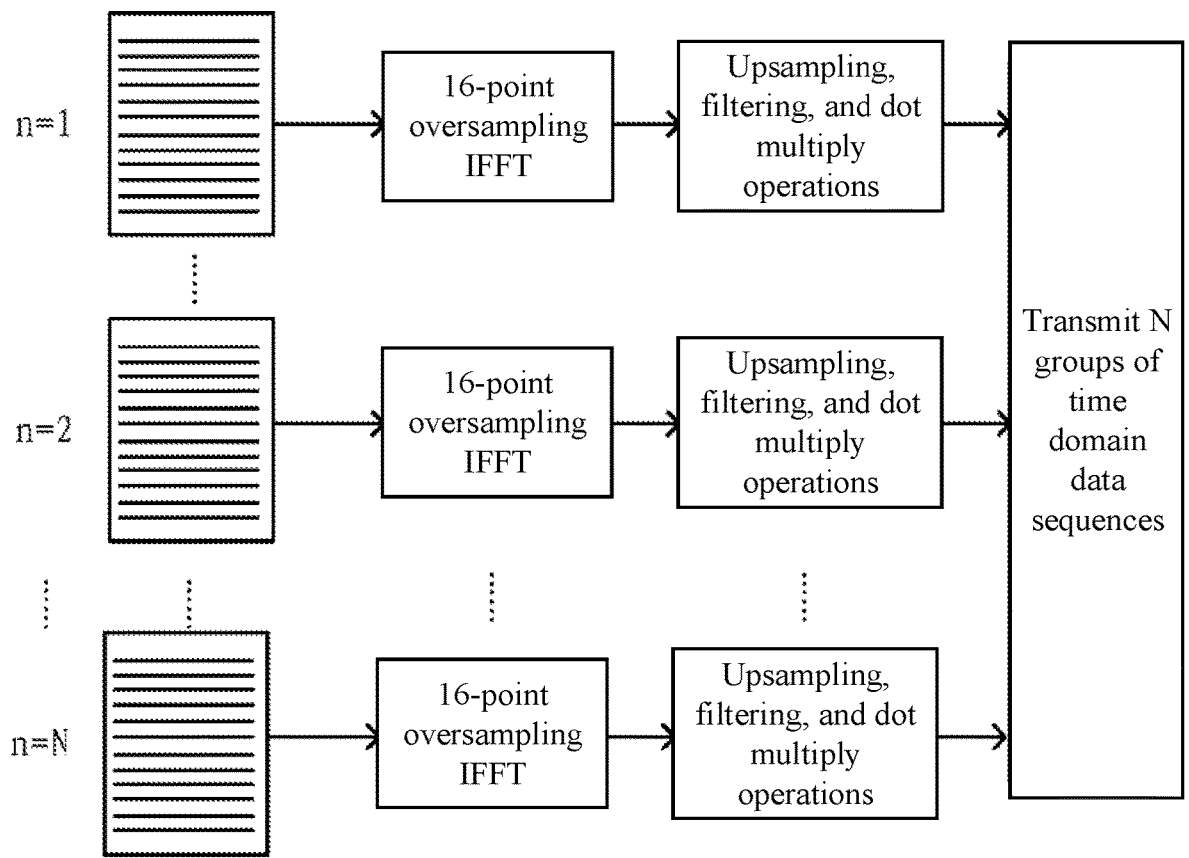
FIG. 7 is an example diagram of another data transmission method according to an embodiment of the present application.

In an example embodiment, the to-be-transmitted data is transmitted in the N frequency domain resource blocks, and each of the N resource blocks includes k(n) subcarriers. FIG. 7 is an example diagram of another data transmission method according to an embodiment of the present application Referring to FIG. 7, the numbers of subcarriers included in the N resource blocks are the same, and k(n)=12; the spectrum bandwidths of the N resource blocks are equal, and the spectrum intervals of adjacent frequency domain resource blocks are not equal. The spectrum interval between the first frequency domain resource block and the second frequency domain resource block shown in FIG. 7 is greater than the spectrum bandwidth of the resource block, that is, spare spectrum resource or other spectrum resource exists between the first frequency domain resource block and the second frequency domain resource block.

The inverse Fourier transform is separately performed on the to-be-transmitted data on the k(n) subcarriers of each resource block so as to obtain N groups of time domain data sequences. In the embodiment of the present application, based on the data on 12 subcarriers, 4 more zeros are added so that the inverse Fourier transform is a 16-point oversampling inverse Fourier transform, that is, the number of IFFT points is 2 to the power of i. Then, the upsampling, filtering, and dot multiply operations are separately performed on the N groups of time domain data sequences. In the embodiment of the present application, it is assumed that the filtering function for filtering is a frequency domain root-raised cosine function; and a data sequence multiplied in the dot multiply operation includes a data sequence of which modulo are equal and phases sequentially change by the same value θ(n). Moreover, different groups of time domain data sequences correspond to different θ(n).

For example, the first group (that is, n=1) of the time domain data sequence is (a1, a2, . . . , a16). After R times of upsampling (in the embodiment of the present application, it is assumed that R=4), the time domain data sequence is (a1, 0, 0, 0, a2, 0, 0, 0, . . . , a16, 0, 0, 0). Assuming that a data sequence in the form of a time domain discrete function of the filtering function is (f1, f2, f3, . . . , fM), then after the convolution operation of the time domain data sequence and the time domain filtering function, the resulting data sequence is assumed to be af(j), where j=1, 2, . . . , and 64+M−1. Assuming that a data sequence for the dot multiply is (exp(j.0), exp(j.0), exp(j.0), exp(j.0)), where the modulus is 1, θ(1)=0, and the phase of each element of the data sequence sequentially changes by the same value θ(1)=0 (here each element is equal to 1). During the dot multiply operation, the preceding dot-multiplied data sequence is repeated periodically so that the length is also 64+M−1. After the dot multiply operation, the first group of the time domain data sequence becomes af'(j), where j=1, 2, . . . , 64+M−1.

For example, the second group (that is, n=2) of the time domain data sequence is (b1, b2, . . . , b16). After R times of upsampling (in the embodiment of the present application, it is assumed that R=4), the time domain data sequence is (b1, 0, 0, 0, b2, 0, 0, 0, . . . , b16, 0, 0, 0). If the data sequence in the form of the time domain discrete function of the filtering function is still (f1, f2, f3, . . . , fM), then after the convolution operation of the time domain data sequence and the time domain filtering function, the resulting data sequence is assumed to be bf(j), where j=1, 2, . . . , and 64+M−1. Assuming that the multiplied data sequence is (exp(j.0), exp(j.pi/2), exp(j.pi), exp(j.3pi/2)), where the modulus is 1, θ(2)=pi/2, and the phase of each element of the data sequence sequentially changes by the same value θ(2)=pi/2. During the dot multiply operation, the preceding dot-multiplied data sequence is repeated periodically so that the length is also 64+M−1. After the dot multiply operation, the second group of the time domain data sequence becomes bf'(j), where j=1, 2, . . . , 64+M−1. Assuming that in this embodiment, N=2, then two groups of time domain data sequences are transmitted.

Transmitting the two groups of time domain data sequences further includes adding the two groups of time domain data sequences to form one group of the time domain data sequence: af'(j)+bf'(j), where j=1, 2, . . . , 64+M−1.

The preceding dot multiply operation may also be performed on the filtering function so that different new filtering functions are obtained for different resource blocks. Then, the time domain convolution operation is separately performed on the upsampled data of different resource blocks using different new filtering functions to form the N groups of time domain data sequences.

Figure 8:
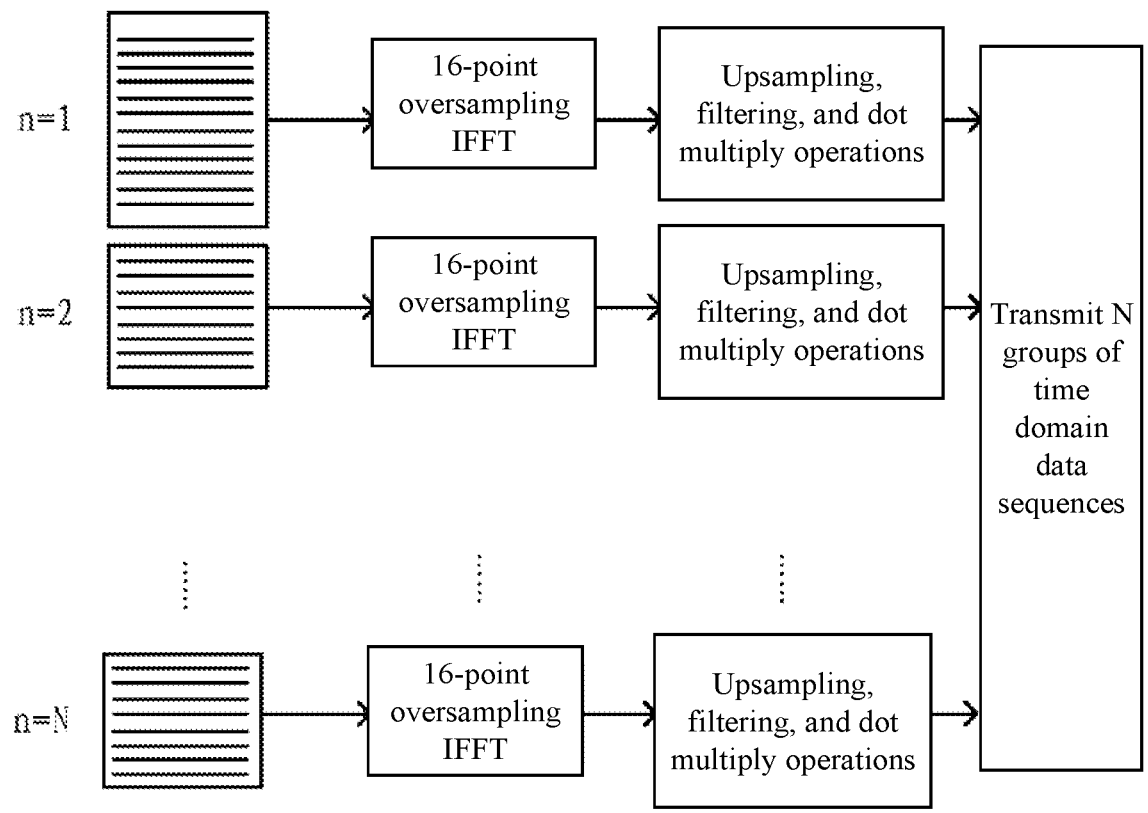
FIG. 8 is an example diagram of another data transmission method according to an embodiment of the present application.

In an example embodiment, the to-be-transmitted data is transmitted in the N frequency domain resource blocks, and each of the N resource blocks includes k(n) subcarriers. FIG. 8 is an example diagram of another data transmission method according to an embodiment of the present application. Referring to FIG. 8, the number of subcarriers included in the N resource blocks are not equal, k(1)=12, and other k(n)=8; the spectrum bandwidths of the N resource blocks are not equal, and the spectrum intervals of adjacent frequency domain resource blocks are also not equal; and the inverse Fourier transform is separately performed on the to-be-transmitted data on the k(n) subcarriers of each resource block to obtain the N groups of time domain data sequences. In this embodiment, different numbers of zeros are supplemented so that the inverse Fourier transform of each frequency domain resource block is the 16-point oversampling inverse Fourier transform (that is, the number of IFFT points is 2 to the power of i). In other words, based on the resource block with the maximum number of subcarriers, the number of IFFT points reaches 2 to the power of i by zero padding. In other words, the number of IFFT points is at least greater than 12.

The inverse Fourier transform is separately performed on the to-be-transmitted data on the k(n) subcarriers of each resource block so as to obtain N groups of time domain data sequences. In the embodiment of the present application, based on the data on 12 subcarriers, 4 more zeros are added so that the inverse Fourier transform is a 16-point oversampling inverse Fourier transform, that is, the number of IFFT points is 2 to the power of i. Then, the upsampling, filtering, and dot multiply operations are separately performed on the N groups of time domain data sequences. In the embodiment of the present application, it is assumed that the filtering function for filtering is a frequency domain root-raised cosine function; and a data sequence multiplied in the dot multiply operation includes a data sequence of which modulo are equal and phases sequentially change by the same value θ(n). Moreover, different groups of time domain data sequences correspond to different θ(n).

For example, the first group (that is, n=1) of the time domain data sequence is (a1, a2, . . . , a16). After R times of upsampling (in the embodiment of the present application, it is assumed that R=4), the time domain data sequence is (a1, 0, 0, 0, a2, 0, 0, 0, . . . , a16, 0, 0, 0). Assuming that a data sequence in the form of a time domain discrete function of the filtering function is (f1, f2, f3, . . . , fM), then after the convolution operation of the time domain data sequence and the time domain filtering function, the resulting data sequence is assumed to be af(j), where j=1, 2, . . . , and 64+M−1. Assuming that a data sequence for the dot multiply is (exp(j.0), exp(j.0), exp(j.0), exp(j.0)), where the modulus is 1, θ(1)=0, and the phase of each element of the data sequence sequentially changes by the same value θ(1)=0 (here each element is equal to 1). During the dot multiply operation, the preceding dot-multiplied data sequence is repeated periodically so that the length is also 64+M−1. After the dot multiply operation, the first group of the time domain data sequence becomes af(j), where j=1, 2, . . . , 64+M−1.

For example, the second group (that is, n=2) of the time domain data sequence is (b1, b2, . . . , b16). After R times of upsampling (in the embodiment of the present application, it is assumed that R=4), the time domain data sequence is (b1, 0, 0, 0, b2, 0, 0, 0, . . . , b16, 0, 0, 0). If the data sequence in the form of the time domain discrete function of the filtering function is still (f1, f2, f3, . . . , fM), then after the convolution operation of the time domain data sequence and the time domain filtering function, the resulting data sequence is assumed to be bf(j), where j=1, 2, . . . , and 64+M−1. Assuming that the multiplied data sequence is (exp(j.0), exp(j.pi/2), exp(j.pi), exp(j.3pi/2)), where the modulus is 1, θ(2)=pi/2, and the phase of each element of the data sequence sequentially changes by the same value θ(2)=pi/2. During the dot multiply operation, the preceding dot-multiplied data sequence is repeated periodically so that the length is also 64+M−1. After the dot multiply operation, the second group of the time domain data sequence becomes bf'(j), where j=1, 2, . . . , 64+M−1. Assuming that in this embodiment, N=2, then two groups of time domain data sequences are transmitted.

Transmitting the two groups of time domain data sequences further includes adding the two groups of time domain data sequences to form one group of the time domain data sequence: af(j)+bf'(j), where j=1, 2, . . . , 64+M−1.

The preceding dot multiply operation may also be performed on the filtering function so that different new filtering functions are obtained for different resource blocks. Then, the time domain convolution operation is separately performed on the upsampled data of different resource blocks using different new filtering functions to form the N groups of time domain data sequences.

Figure 9:
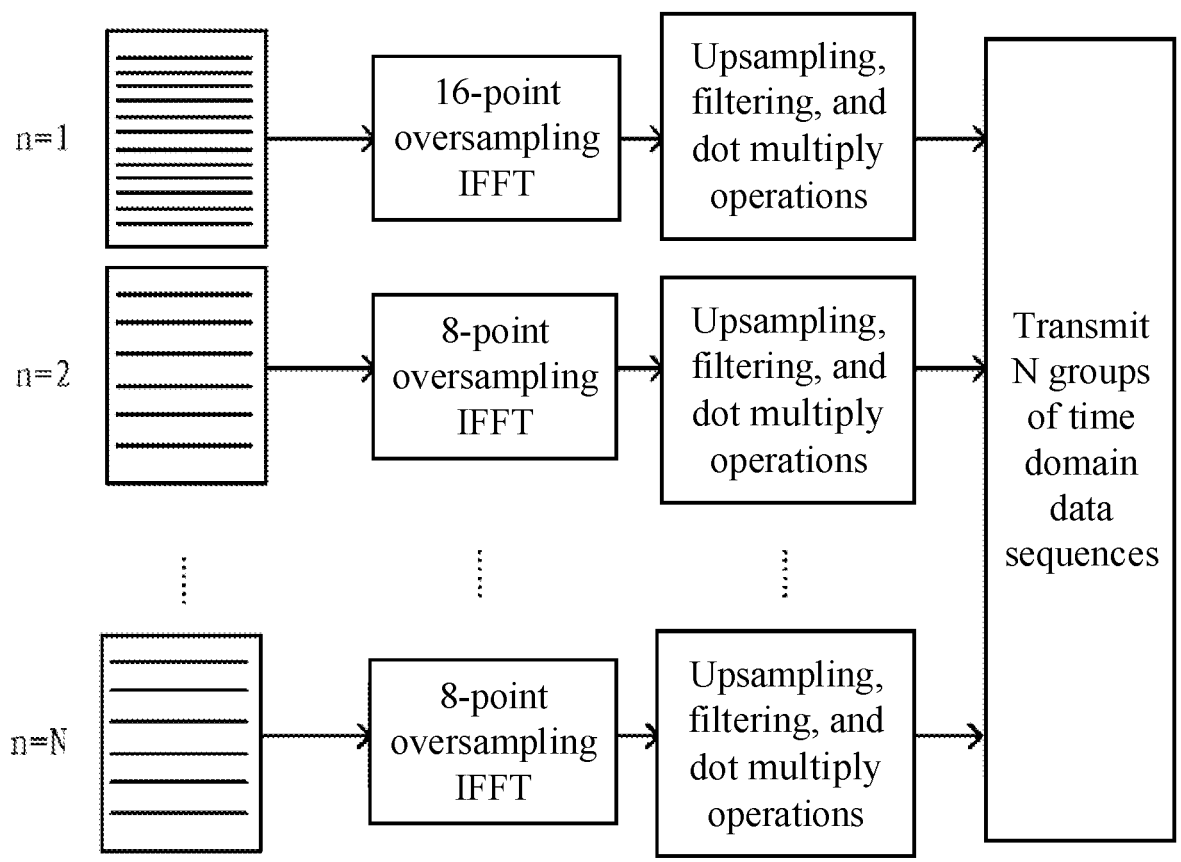
FIG. 9 is an example diagram of another data transmission method according to an embodiment of the present application.

In an example embodiment, the to-be-transmitted data is transmitted in the N frequency domain resource blocks, and each of the N resource blocks includes k(n) subcarriers. In the embodiment of the present application, the spectrum bandwidths of the N resource blocks are equal, but the subcarrier spacings are different. The subcarrier spacing of the first resource block is small, and the subcarrier spacing of the remaining resource blocks is two times the subcarrier spacing of the first resource block. The number of subcarriers k(1)=12, and the other k(n)=6. FIG. 9 is an example diagram of another data transmission method according to an embodiment of the present application. Referring to FIG. 9, the inverse Fourier transform is separately performed on the to-be-transmitted data on k(n) subcarriers of each resource block to obtain the N groups of time domain data sequences. In the embodiment of the present application, different numbers of zeros are supplemented so that the number of IFFT points of the inverse Fourier transform of each frequency domain resource block is 2 to the power of i. The ratio of the length of the time domain data sequence after each IFFT corresponding to the first resource block to the length of the time domain data sequence after each IFFT corresponding to other resource blocks satisfies 2 to the power of i (that is, $2^i$). In the embodiment of the present application, i=1. Therefore, for other resource blocks, two time domain data sequences need to be connected in series so that the time domain length of the two time domain data sequences of other resource blocks is equal to the time domain length of one time domain data sequence of the first resource block. Then, the upsampling, filtering, and dot multiply operations are separately performed on the N groups of time domain data sequences. In the embodiment of the present application, it is assumed that the filtering function for filtering is a frequency domain root-raised cosine function: and a data sequence multiplied in the dot multiply operation includes a data sequence of which modulo are equal and phases sequentially change by the same value θ(n). Moreover, different groups of time domain data sequences correspond to different θ(n).

For example, the first group (that is, n=1) of the time domain data sequence is (a1, a2, . . . , a16). After R times of upsampling (in the embodiment of the present application, it is assumed that R=4), the time domain data sequence is (a1, 0, 0, 0, a2, 0, 0, 0, . . . , a16, 0, 0, 0). Assuming that a data sequence in the form of a time domain discrete function of the filtering function is (f1, f2, f3, . . . , fM), then after the convolution operation of the time domain data sequence and the time domain filtering function, the resulting data sequence is assumed to be af(j), where j=1, 2, . . . , and 64+M−1. Assuming that a data sequence for the dot multiply is (exp(j.0), exp(j.0), exp(j.0), exp(j.0)), where the modulus is 1, θ(1)=0, and the phase of each element of the data sequence sequentially changes by the same value θ(1)=0 (here each element is equal to 1). During the dot multiply operation, the preceding dot-multiplied data sequence is repeated periodically so that the length is also 64+M−1. After the dot multiply operation, the first group of the time domain data sequence becomes af(j), where j=1, 2, . . . , 64+M−1.

For example, the second group (that is, n=2) of the time domain data sequence is (b1, b2, . . . , b8). After R times of upsampling (in the embodiment of the present application, it is assumed that R=8), the time domain data sequence is (b1, 0, 0, 0, b2, 0, 0, 0, . . . , b8, 0, 0, 0). If the data sequence in the form of the time domain discrete function of the filtering function is still (f1, f2, f3, . . . , fM), then after the convolution operation of the time domain data sequence and the time domain filtering function, the resulting data sequence is assumed to be bf(j), where j=1, 2, . . . , and 64+M−1. Assuming that the multiplied data sequence is (exp(j.0), exp(j.pi/2), exp(j.pi), exp(j.3pi/2)), where the modulus is 1, θ(2)=pi/2, and the phase of each element of the data sequence sequentially changes by the same value θ(2)=pi/2. During the dot multiply operation, the preceding dot-multiplied data sequence is repeated periodically so that the length is also 64+M−1. After the dot multiply operation, the second group of the time domain data sequence becomes bf(j), where j=1, 2, . . . , 64+M−1. Assuming that in this embodiment, N=2, then two groups of time domain data sequences are transmitted.

Transmitting the two groups of time domain data sequences further includes adding the two groups of time domain data sequences to form one group of the time domain data sequence: af(j)+bf(j), where j=1, 2, . . . , 64+M−1.

The preceding dot multiply operation may also be performed on the filtering function so that different new filtering functions are obtained for different resource blocks. Then, the time domain convolution operation is separately performed on the upsampled data of different resource blocks using different new filtering functions to form the N groups of time domain data sequences.

Figure 10:
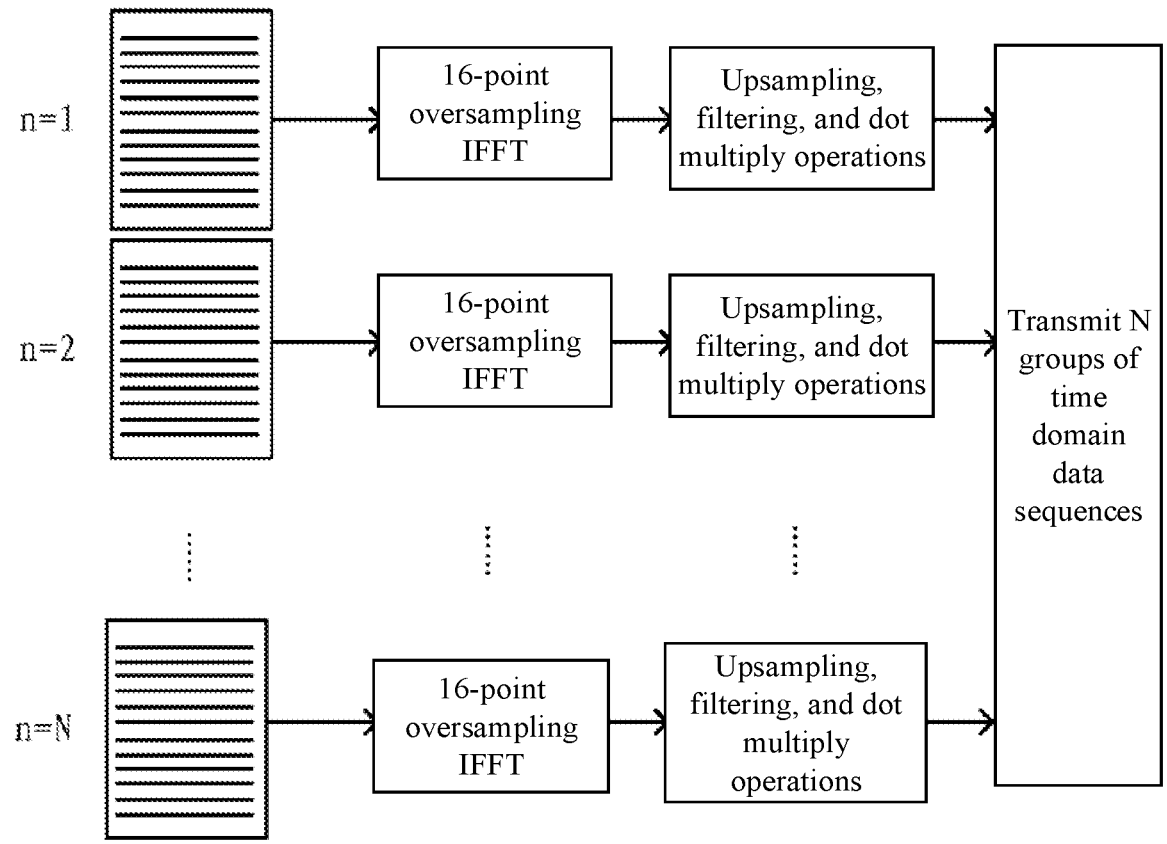
FIG. 10 is an example diagram of a data modulation method according to an embodiment of the present application.

For example, the to-be-transmitted data sequences are divided into N groups, and each group includes k(n) pieces of data. FIG. 10 is an example diagram of a data modulation method according to an embodiment of the present application. Referring to FIG. 10, the numbers of pieces of data included in the groups are equal, k(n)=12, and the inverse Fourier transform is separately performed on each group of data sequences to obtain N groups of data sequences. In this embodiment, based on 12 pieces of data, 4 more zeros are added so that the inverse Fourier transform is the 16-point oversampling inverse Fourier transform (that is, the number of IFFT points is 2 to the power of i).

Then, the upsampling, filtering, and dot multiply operations are separately performed on the N groups of time domain data sequences. In the embodiment of the present application, it is assumed that the filtering function for filtering is a frequency domain root-raised cosine function; and a data sequence multiplied in the dot multiply operation includes a data sequence of which modulo are equal and phases sequentially change by the same value θ(n). Moreover, different groups of time domain data sequences correspond to different θ(n).

For example, the first group (that is, n=1) of the time domain data sequence is (a1, a2, . . . , a16). After R times of upsampling (in the embodiment of the present application, it is assumed that R=4), the time domain data sequence is (a1, 0, 0, 0, a2, 0, 0, 0, . . . , a16, 0, 0, 0). Assuming that a data sequence in the form of a time domain discrete function of the filtering function is (f1, f2, f3, . . . , fM), then after the convolution operation of the time domain data sequence and the time domain filtering function, the resulting data sequence is assumed to be af(j), where j=1, 2, . . . , and 64+M−1. Assuming that a data sequence for the dot multiply is (exp(j.0), exp(j.0), exp(j.0), exp(j.0)), where the modulus is 1, θ(1)=0, and the phase of each element of the data sequence sequentially changes by the same value θ(1)=0 (here each element is equal to 1). During the dot multiply operation, the preceding dot-multiplied data sequence is repeated periodically so that the length is also 64+M−1. After the dot multiply operation, the first group of the time domain data sequence becomes af(j), where j=1, 2, . . . , 64+M−1.

For example, the second group (that is, n=2) of the time domain data sequence is (b1, b2, . . . , b16). After R times of upsampling (in the embodiment of the present application, it is assumed that R=4), the time domain data sequence is (b1, 0, 0, 0, b2, 0, 0, 0, . . . , b16, 0, 0, 0). If the data sequence in the form of the time domain discrete function of the filtering function is still (f1, f2, f3, . . . , fM), then after the convolution operation of the time domain data sequence and the time domain filtering function, the resulting data sequence is assumed to be bf(j), where j=1, 2, . . . , and 64+M−1. Assuming that the multiplied data sequence is (exp(j.0), exp(j.pi/2), exp(j.pi), exp(j.3pi/2)), where the modulus is 1, θ(2)=pi/2, and the phase of each element of the data sequence sequentially changes by the same value θ(2)=pi/2. During the dot multiply operation, the preceding dot-multiplied data sequence is repeated periodically so that the length is also 64+M−1. After the dot multiply operation, the second group of the time domain data sequence becomes bf(j), where j=1, 2, . . . , 64+M−1. Assuming that in this embodiment, N=2, then two groups of time domain data sequences are transmitted.

Transmitting the two groups of time domain data sequences further includes adding the two groups of time domain data sequences to form one group of the time domain data sequence: af(j)+bf(j), where j=1, 2, . . . , 64+M−1.

The preceding dot multiply operation may also be performed on the filtering function so that different new filtering functions are obtained for different resource blocks. Then, the time domain convolution operation is separately performed on the upsampled data of different resource blocks using different new filtering functions to form the N groups of time domain data sequences.

Figure 11:
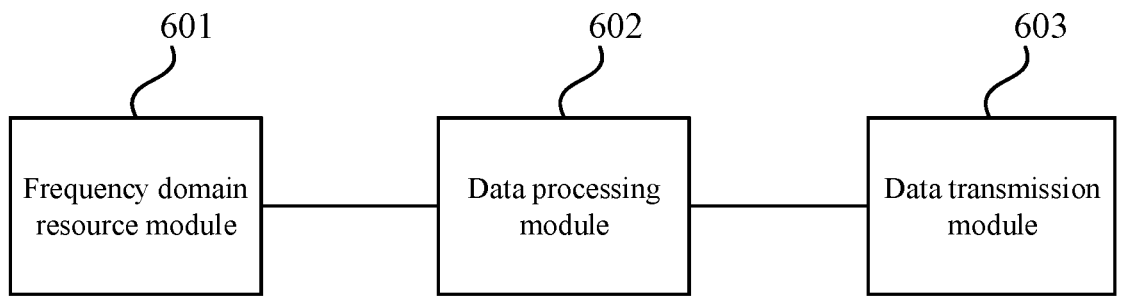
FIG. 11 is a structural diagram of a data transmission apparatus according to an embodiment of the present application.

FIG. 11 is a structural diagram of a data transmission apparatus according to an embodiment of the present application. The data transmission apparatus may perform the data transmission method according to any embodiment of the present application and has the corresponding function modules and effects of the performed method. The apparatus may be implemented by software and/or hardware and includes a frequency domain resource module 601, a data processing module 602, and a data transmission module 603.

The frequency domain resource module 601 is configured to transmit to-be-transmitted data in N frequency domain resource blocks, where each of the N frequency domain resource blocks includes K(n) subcarriers, where n=1, 2, . . . , N, N is greater than or equal to 1, and K(n) is greater than or equal to 1.

The data processing module 602 is configured to perform an inverse Fourier transform and an upsampling operation on the to-be-transmitted data in each of the frequency domain resource blocks to form N groups of data sequences.

The data transmission module 603 is configured to transmit the N groups of data sequences.

In the embodiment of the present application, the frequency domain resource module 601 transmits the to-be-transmitted data in one or more frequency domain resource blocks, where each frequency domain resource block may include one or more subcarriers; the data processing module 602 performs the inverse Fourier transform and the upsampling operation on the to-be-transmitted data in each of the frequency domain resource blocks to generate one or more groups of data sequences; and the data transmission module 603 transmits the generated data sequences, so as to achieve the common use of multiple frequency domain resource blocks, thereby improving frequency domain resource utilization.

Based on the preceding embodiment of the application, a sampling multiple of the upsampling operation satisfies 2 to the power of i, where i is an integer.

Based on the preceding embodiment of the application, the data processing module 602 includes a zero padding unit.

The zero padding unit is configured to separately insert $2^i-1$ zeros into each data generated after the inverse Fourier transform of the to-be-transmitted data, where i is an integer.

Based on the preceding embodiment of the application, the apparatus further includes a filtering processing unit configured to filter the N groups of data sequences, where the filtering includes time domain convolution filtering.

Based on the preceding embodiment of the application, a filtering function for filtering in the filtering processing unit includes at least one of the following: a root-raised cosine function, a raised cosine function, a rectangular function, or an isotropic orthogonal transform function.

Based on the preceding embodiment of the application, in the filtering processing unit, filtering function parameters used by different frequency domain resource blocks are different.

Based on the preceding embodiment of the application, the apparatus further includes a dot multiply processing unit configured to perform a dot multiply operation on the N groups of data sequences Based on the preceding embodiment of the application, a to-be-multiplied sequence in the dot multiply processing unit includes a sequence of values of which modulo are equal and phases sequentially change by the same value $\theta(n)$, where different frequency domain resource blocks correspond to different $\theta(n)$.

Based on the preceding embodiment of the application, in the filtering processing unit, a function for filtering is after a dot multiply operation, and a to-be-multiplied sequence includes a data sequence of which modulo are equal and phases sequentially change by the same value $\theta(n)$, where different frequency domain resource blocks use different $\theta(n)$.

Based on the preceding embodiment of the application, the data transmission module 603 is configured to, in the case where N is greater than 1, add the N groups of data sequences as a first data sequence and transmit the first data sequence.

Based on the preceding embodiment of the application, in the apparatus, the ratio of spectrum bandwidths of any two frequency domain resource blocks satisfies 2 to the power of i, where i is an integer.

Based on the preceding embodiment of the application, in the apparatus, the ratio of the numbers of subcarriers of any two frequency domain resource blocks satisfies 2 to the power of i, where i is an integer.

Based on the preceding embodiment of the application, in the apparatus, the number of inverse Fourier transform points of the inverse Fourier transform is greater than or equal to K(n).

Based on the preceding embodiment of the application, in the apparatus, the number of inverse Fourier transform points of the inverse Fourier transform is 2 to the power of i, where i is an integer.

Based on the preceding embodiment of the application, in the apparatus, the number K(n) of subcarriers on at least one frequency domain resource block does not satisfy 2 to the power of i, and oversampling inverse Fourier transform is used so that the number of inverse Fourier transform points is 2 to the power of i, and the numbers of inverse Fourier transform points used by each of the frequency domain resource blocks are the same.

Based on the preceding embodiment of the application, the data processing module 602 in the apparatus is configured to, in the case where adjacent subcarrier spacings of the N frequency domain resource blocks are equal, but the numbers of the included subcarriers are not equal, use oversampling inverse Fourier transform so that the number of inverse Fourier transform points is 2 to the power of i, and the numbers of inverse Fourier transform points used by each of the frequency domain resource blocks are the same.

Based on the preceding embodiment of the application, in the apparatus, the number of inverse Fourier transform points of the inverse Fourier transform is less than or equal to the sum of the numbers of subcarriers included in the N frequency domain resource blocks.

Based on the preceding embodiment of the application, in the apparatus, the number of inverse Fourier transform points of the inverse Fourier transform is less than or equal to two times the number of subcarriers included in the N frequency domain resource blocks.

Based on the preceding embodiment of the application, the apparatus further includes a cyclic prefix module configured to add a CP to each data sequence.

Based on the preceding embodiment of the application, the apparatus further includes a guard interval module configured to add a GI to each data sequence, where the GI is empty data.

Based on the preceding embodiment of the application, in the apparatus, the to-be-transmitted data includes constellation adjustment data or reference signal data.

Figure 12:
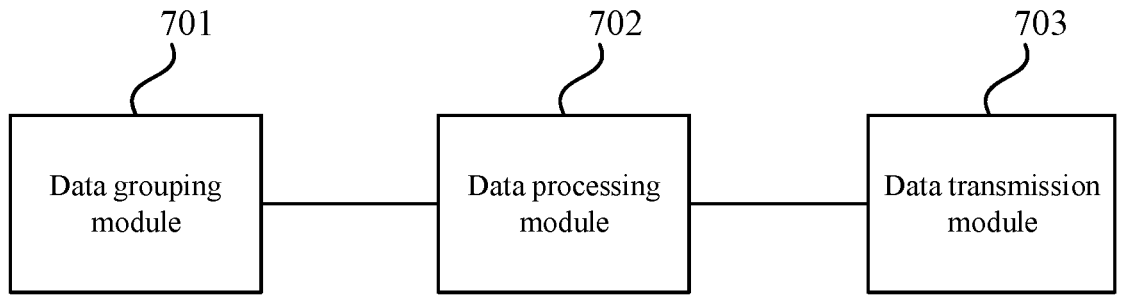
FIG. 12 is a structural diagram of a data modulation apparatus according to an embodiment of the present application.

FIG. 12 is a structural diagram of a data modulation apparatus according to an embodiment of the present application. The data modulation apparatus may perform the data modulation method according to any embodiment of the present application and has the corresponding function modules and effects of the performed method. The apparatus may be implemented by software and/or hardware and includes a data grouping module 701, a data processing module 702, and a data transmission module 703.

The data grouping module 701 is configured to divide to-be-transmitted data into N groups of data sets, where each group of data sets includes K(n) pieces of to-be-transmitted data, where n=1, 2, . . . , N, a value of N is greater than or equal to 1, and a value of K(n) is greater than or equal to 1.

The data processing module 702 is configured to perform an inverse Fourier transform and an upsampling operation on each of the data sets to form N groups of data sequences.

The data transmission module 703 is configured to transmit the N groups of data sequences.

Based on the preceding embodiment of the application, in the apparatus, a sampling multiple of the upsampling operation satisfies 2 to the power of i, where i is an integer.

Based on the preceding embodiment of the application, the apparatus further includes a filtering unit configured to filter the N groups of data sequences, where the filtering includes time domain convolution filtering.

Based on the preceding embodiment of the application, a filtering function for filtering in the filtering unit includes at least one of the following: a root-raised cosine function, a raised cosine function, a rectangular function, or an isotropic orthogonal transform function.

Based on the preceding embodiment of the application, the apparatus further includes a dot multiply unit configured to perform a dot multiply operation on the N groups of data sequences.

Based on the preceding embodiment of the application, a to-be-multiplied sequence in the dot multiply unit includes a sequence of values of which modulo are equal and phases sequentially change by the same $\theta(n)$, where different data sets correspond to different values of the $\theta(n)$.

Based on the preceding embodiment of the application, in the filtering unit, a function for filtering is after a dot multiply operation, and a to-be-multiplied sequence includes a data sequence of which modulo are equal and phases sequentially change by the same $\theta(n)$, where different data sets use different $\theta(n)$.

Based on the preceding embodiment of the application, the data transmission module 703 is configured to, in the case where N is greater than 1, add the N groups of data sequences as a first data sequence and transmit the first data sequence.

Based on the preceding embodiment of the application, the numbers of pieces of the to-be-transmitted data included in each of the data sets are different.

Based on the preceding embodiment of the application, the numbers of pieces of the to-be-transmitted data included in each of the data sets are the same.

Based on the preceding embodiment of the application, the number of inverse Fourier transform points of the inverse Fourier transform is greater than or equal to K(n).

Based on the preceding embodiment of the application, the value of the number of inverse Fourier transform points of the inverse Fourier transform is 2 to the power of i, where i is an integer.

Based on the preceding embodiment of the application, the number of pieces of to-be-transmitted data included in at least one data set does not satisfy 2 to the power of i, and oversampling inverse Fourier transform is used so that the number of inverse Fourier transform points is 2 to the power of i, and the numbers of inverse Fourier transform points used by each of the data sets are the same.

Figure 13:
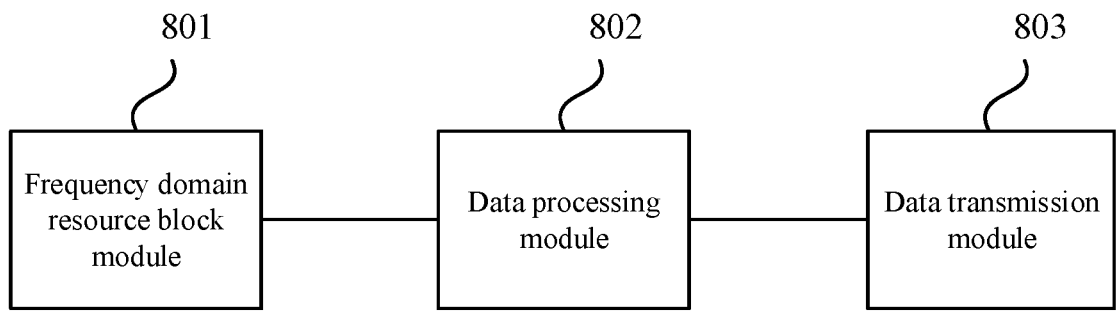
FIG. 13 is a structural diagram of another data transmission apparatus according to an embodiment of the present application.

FIG. 13 is a structural diagram of another data transmission apparatus according to an embodiment of the present application. The data transmission apparatus may perform the data transmission method according to any embodiment of the present application and has the corresponding function modules and effects of the performed method. The apparatus may be implemented by software and/or hardware and includes a frequency domain resource block module 801, a data processing module 802, and a data transmission module 803.

The frequency domain resource block module 801 is configured to transmit to-be-transmitted data in N frequency domain resource blocks, where each frequency domain resource block includes K(n) subcarriers, where n=1, 2, ... , N, a value of N is greater than or equal to 1, and a value of K(n) is greater than or equal to 1.

The data processing module 802 is configured to perform an inverse Fourier transform on the to-be-transmitted data in each of the frequency domain resource blocks to form N groups of data sequences.

The data transmission module 803 is configured to transmit the N groups of data sequences. The number K(n) of subcarriers on at least one frequency domain resource block does not satisfy 2 to the power of i, and oversampling inverse Fourier transform is used so that the number of inverse Fourier transform points is 2 to the power of i, and the numbers of inverse Fourier transform points used by each of the frequency domain resource blocks are the same, where i is an integer, and the number of inverse Fourier transform points is less than or equal to the sum of the numbers of subcarriers included in the N frequency domain resource blocks.

Based on the preceding embodiment of the application, the number of inverse Fourier transform points of the inverse Fourier transform is less than or equal to two times the number of subcarriers included in the frequency domain resource blocks.

Figure 14:
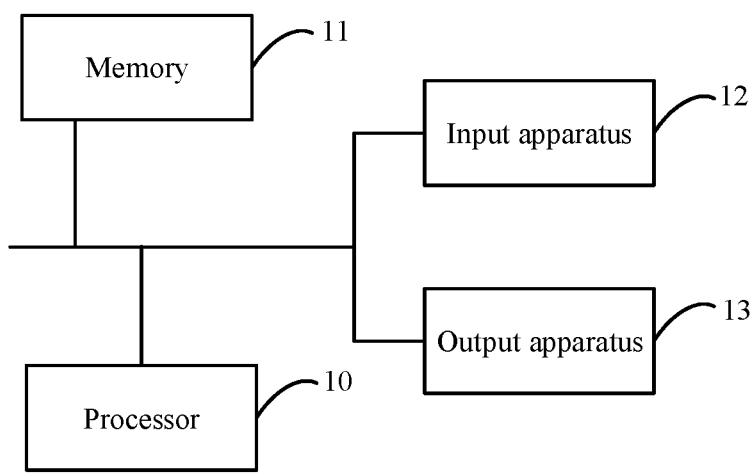
FIG. 14 is a structural diagram of an electronic device according to an embodiment of the present application.

FIG. 14 is a structural diagram of an electronic device according to an embodiment of the present application. The electronic device includes a processor 10, a memory 11, an input apparatus 12, and an output apparatus 13. One or more processors 10 may be included in the electronic device. One processor 10 is shown as an example in FIG. 14. The processor 10, the memory 11, the input apparatus 12, and the output apparatus 13 in the electronic device may be connected via a bus or in other manners. The connection via a bus is shown as an example in FIG. 14.

As a computer-readable storage medium, the memory 11 may be configured to store software programs, computer-executable programs, and modules, such as modules (the frequency domain resource module 601, the data processing module 602, and the data transmission module 603; or the data grouping module 701, the data processing module 702, and the data transmission module 703; or the frequency domain resource block module 801, the data processing module 802, and the data transmission module 803) corresponding to the apparatus in the embodiment of the present application. The processor 10 executes software programs, instructions, and modules stored in the memory 11 to perform function applications and data processing of the electronic device, that is, to perform the preceding method.

The memory 11 may mainly include a program storage region and a data storage region. The program storage region may store an operating system and an application program required by at least one function. The data storage region may store data created based on the use of the electronic device. Additionally, the memory 11 may include a high-speed random-access memory and may also include a non-volatile memory, such as at least one magnetic disk memory, a flash memory, or another nonvolatile solid-state memory. In some examples, the memory 11 may include memories that are remotely disposed relative to the processor 10 and these remote memories may be connected to the electronic device via a network. Examples of the preceding network include, but are not limited to, the Internet, an intranet, a local area network, a mobile communication network, and a combination thereof.

The input apparatus 12 may be configured to receive inputted digital or character information and generate key signal input related to user settings and function control of the electronic device. The output apparatus 13 may include a display device such as a display screen.

The embodiments of the present application further provide a storage medium including computer-executable instructions. When executed by a computer processor, the computer-executable instructions are used for causing the computer processor to perform a data transmission method. The method includes the following.

To-be-transmitted data is transmitted in N frequency domain resource blocks, where each of the N frequency domain resource blocks includes K(n) subcarriers, where n=1, 2, . . . , N, N is greater than or equal to 1, and K(n) is greater than or equal to 1; inverse Fourier transform and an upsampling operation are performed on the to-be-transmitted data in each of the N frequency domain resource blocks so as to form N groups of data sequences; and the N groups of data sequences are transmitted.

Alternatively, when executed by the computer processor, the computer-executable instructions are used for causing the computer processor to perform a data modulation method. The method includes the following.

To-be-transmitted data is divided into N groups of data sets, where each group of the N groups of data sets includes K(n) pieces of to-be-transmitted data, where n=1, 2, . . . , N, a value of N is greater than or equal to 1, and a value of K(n) is greater than or equal to 1; inverse Fourier transform and an upsampling operation are performed on each of the data sets so as to form N groups of data sequences; and the N groups of data sequences are transmitted.

Alternatively, when executed by the computer processor, the computer-executable instructions are used for causing the computer processor to perform a data transmission method. The method includes the following.

To-be-transmitted data is transmitted in N frequency domain resource blocks, where each of the N frequency domain resource blocks includes K(n) subcarriers, where n=1, 2, . . . , N, a value of N is greater than or equal to 1, and a value of K(n) is greater than or equal to 1; inverse Fourier transform is separately performed on the to-be-transmitted data in each of the N frequency domain resource blocks so as to form N groups of data sequences; and the N groups of data sequences are transmitted. The number K(n) of subcarriers on at least one of the N frequency domain resource blocks does not satisfy 2 to the power of i, and oversampling inverse Fourier transform is used so that the number of inverse Fourier transform points is 2 to the power of i, and the numbers of inverse Fourier transform points used by each of the N frequency domain resource blocks are the same, where i is an integer, and the number of inverse Fourier transform points is less than or equal to the sum of the numbers of subcarriers included in the N frequency domain resource blocks.

From the preceding description of the embodiments, the present application may be implemented by means of both software and required general-purpose hardware or by means of hardware. The technical solutions of the present application may be substantially embodied in the form of a software product. The software product in a computer may be stored in a computer-readable storage medium such as a floppy disk, a read-only memory (ROM), a random-access memory (RAM), a flash memory, a hard disk, or an optical disk in the computer and includes instructions for enabling a computer device (which may be a personal computer, a server, or a network device) to perform the method in the embodiments of the present application.

Units and modules included in the embodiment of the preceding apparatus are divided according to functional logic, and the division is not limited to this as long as the corresponding functions can be implemented. Additionally, the names of function units are merely intended for distinguishing between each other and are not to limit the scope of the present application.

It is to be understood by those having ordinary skill in the art that some or all steps of the preceding method and function modules/units in the preceding system or device may be implemented as software, firmware, hardware, and a suitable combination thereof.

In the hardware implementation, the division of the preceding function modules/units may not correspond to the division of physical components. For example, one physical component may have multiple functions, or one function or step may be performed jointly by multiple physical components. Some or all physical components may be implemented as software executed by a processor such as a central processing unit, a digital signal processor, or a microprocessor, may be implemented as hardware, or may be implemented as integrated circuits such as application-specific integrated circuits. Such software may be distributed on computer-readable media. The computer-readable media may include computer storage media (or non-transitory media) and communication media (or transitory media). As known to those having ordinary skill in the art, the term, the computer storage media, includes volatile and non-volatile as well as removable and non-removable media implemented in any method or technology for storing information (such as computer-readable instructions, data structures, program modules, or other data). The computer storage media include, but are not limited to, a RAM, a ROM, an electrically erasable programmable read-only memory (EEPROM), a flash memory, or other memory technologies, a compact disc read-only memory (CD-ROM), a digital versatile disc (DVD) or other optical disc memories, magnetic cassettes, magnetic tapes, magnetic disk memories or other magnetic storage apparatuses, or any other medium used for storing the desired information and accessible by a computer. Moreover, as known to those having ordinary skill in the art, the communication media generally include computer-readable instructions, data structures, program modules, or other data in carriers or in modulated data signals transported in other transport mechanisms and may include any information delivery medium.

What is claimed is:

1. A data transmission method, comprising:
transmitting to-be-transmitted data in N frequency domain resource blocks, wherein an n-th frequency domain resource block of the N frequency domain resource blocks comprises K(n) subcarriers, wherein n=1, 2, . . . , N, N is greater than or equal to 1, and the K(n) is greater than or equal to 1;
performing an inverse Fourier transform and an upsampling operation on to-be-transmitted data in each of the N frequency domain resource blocks to form N groups of data sequences; and
transmitting the N groups of data sequences;
after performing the inverse Fourier transform and the upsampling operation on the to-be-transmitted data in each of the N frequency domain resource blocks, the method further comprises: performing filtering on the N groups of data sequences, wherein the filtering comprises time domain convolution filtering; and
after performing the filtering on the N groups of data sequences, the method further comprises: performing a dot multiply operation on the N groups of data sequences, wherein a to-be-multiplied sequence which is multiplied by the N groups of data sequences in the dot multiply operation comprises a sequence of data of which modulo are equal and phases sequentially change by a same value θ(n), wherein different blocks of the N frequency domain resource blocks correspond to different values of θ(n).

2. The method of claim 1, wherein filtering function parameters used by different ones of the N frequency domain resource blocks are different.

3. The method of claim 1, wherein a function for the filtering is multiplied, and a to-be-multiplied sequence comprises the sequence of data of which modulo are equal and phases sequentially change by the same value θ(n), wherein different blocks of the N frequency domain resource blocks use different values of θ(n).

4. The method of claim 1, wherein transmitting the N groups of data sequences comprises:
in a case where N is greater than 1, adding the N groups of data sequences as a first data sequence; and
transmitting the first data sequence.

5. The method of claim 1, wherein the method further comprises one of:
a ratio of numbers of subcarriers of any two of the N frequency domain resource blocks satisfies 2 to a power of i, wherein i is an integer; or
a number of inverse Fourier transform points of the inverse Fourier transform is less than or equal to a sum of numbers of subcarriers comprised in the N frequency domain resource blocks.

6. The method of claim 1, wherein a number K(n) of subcarriers on at least one of the N frequency domain resource blocks does not satisfy 2 to a power of i, and oversampling inverse Fourier transform is used so that a number of inverse Fourier transform points is 2 to a power of i, and the N frequency domain resource blocks use a same number of inverse Fourier transform points.

7. The method of claim 1, wherein performing the inverse Fourier transform on the to-be-transmitted data on each of the N frequency domain resource blocks comprises:
in a case where adjacent subcarrier spacings of the N frequency domain resource blocks are equal, but numbers of subcarriers comprised in the N frequency domain resource blocks are not equal, oversampling inverse Fourier transform is used so that a number of inverse Fourier transform points is 2 to a power of i, and the N frequency domain resource blocks use a same number of inverse Fourier transform points.

8. An electronic device, comprising:
at least one processor; and
a memory configured to store at least one program;
wherein when executed by the at least one processor, the at least one program causes the at least one processor to perform the data transmission method of claim 1.

9. A non-transitory computer-readable storage medium, storing at least one program executable by at least one processor to perform the data transmission method of claim 1.

10. A data modulation method, comprising:
dividing to-be-transmitted data into N groups of data sets, wherein an n-th group of the N groups of data sets comprises K(n) pieces of to-be-transmitted data, wherein n=1, 2, . . . , N, a value of N is greater than or equal to 1, and a value of K(n) is greater than or equal to 1;
performing an inverse Fourier transform and an upsampling operation on each of the N groups of data sets to form N groups of data sequences; and
transmitting the N groups of data sequences;

after performing the inverse Fourier transform and the upsampling operation on each of the N groups of data sets, the method further comprises: performing filtering on the N groups of data sequences, wherein the filtering comprises time domain convolution filtering; and after performing the filtering on the N groups of data sequences, the method further comprises: performing a dot multiply operation on the N groups of data sequences, wherein a to-be-multiplied sequence which is multiplied by the N groups of data sequences in the dot multiply operation comprises a sequence of data of which modulo are equal and phases sequentially change by a same value θ(n), wherein different data sets of the N groups of data sets correspond to different values of θ(n).

11. The method of claim 10, wherein a function for the filtering is multiplied, and a to-be-multiplied sequence comprises the sequence of data of which modulo are equal and phases sequentially change by the same value θ(n), wherein different data sets of the N groups of data sets use different values of θ(n).

12. The method of claim 10, wherein transmitting the N groups of data sequences comprises:
in a case where N is greater than 1, adding the N groups of data sequences as a first data sequence; and
transmitting the first data sequence.

13. The method of claim 10, wherein the method further comprises one of:
the N groups of data sets comprise different numbers of pieces of to-be-transmitted data; or
a number of pieces of to-be-transmitted data comprised in at least one group of the N groups of data sets does not satisfy 2 to a power of i, and oversampling inverse Fourier transform is used so that a number of inverse Fourier transform points is 2 to a power of i, and the N groups of data sets use a same number of inverse Fourier transform points.

14. An electronic device, comprising:
at least one processor; and
a memory configured to store at least one program;
wherein when executed by the at least one processor, the at least one program causes the at least one processor to perform the data modulation method of claim 10.

15. A data transmission method, comprising:
transmitting to-be-transmitted data in N frequency domain resource blocks, wherein an n-th frequency domain resource block of the N frequency domain resource blocks comprises K(n) subcarriers, wherein n=1, 2, . . . , N, a value of N is greater than or equal to 1, and a value of the K(n) is greater than or equal to 1;
performing an inverse Fourier transform on to-be-transmitted data in each of the N frequency domain resource blocks to form N groups of data sequences; and
transmitting the N groups of data sequences;
wherein a number K(n) of subcarriers on at least one of the N frequency domain resource blocks does not satisfy 2 to a power of i, and oversampling inverse Fourier transform is used so that a number of inverse Fourier transform points is 2 to the power of i, and the N frequency domain resource blocks use a same number of inverse Fourier transform points, wherein i is an integer, and the number of inverse Fourier transform points is less than or equal to a sum of numbers of subcarriers comprised in the N frequency domain resource blocks.

16. An electronic device, comprising:
at least one processor; and a memory configured to store at least one program;
wherein when executed by the at least one processor, the at least one program causes the at least one processor to perform the data transmission method of claim 15.

\* \* \* \* \*